US012621497B2

(12) United States Patent
Yang

(10) Patent No.: US 12,621,497 B2
(45) Date of Patent: *May 5, 2026

(54) DEVICE AND METHOD FOR CODING VIDEO DATA

(71) Applicant: SHARP KABUSHIKI KAISHA, Sakai City (JP)

(72) Inventor: Yu-Chiao Yang, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/778,135

(22) Filed: Jul. 19, 2024

(65) Prior Publication Data

US 2024/0373070 A1 Nov. 7, 2024

Related U.S. Application Data

(63) Continuation of application No. 17/836,278, filed on Jun. 9, 2022, now Pat. No. 12,075,095, which is a continuation of application No. 16/987,304, filed on Aug. 6, 2020, now Pat. No. 11,405,648.

(60) Provisional application No. 62/884,335, filed on Aug. 8, 2019.

(51) Int. Cl.
*H04N 19/70* (2014.01)
*H04N 19/184* (2014.01)
*H04N 19/51* (2014.01)

(52) U.S. Cl.
CPC ........... *H04N 19/70* (2014.11); *H04N 19/184* (2014.11); *H04N 19/51* (2014.11)

(58) Field of Classification Search
CPC .... H04N 19/174; H04N 19/184; H04N 19/51; H04N 19/537; H04N 19/577; H04N 19/70
See application file for complete search history.

(56) References Cited

U.S. PATENT DOCUMENTS

| 2020/0221138 | A1* | 7/2020 | Lee | H04N 19/139 |
| 2020/0296405 | A1* | 9/2020 | Huang | H04N 19/137 |

OTHER PUBLICATIONS

"Series H: Audiovisual and Multimedia Systems Infrastructure of audiovisual services—Coding of moving video, High efficiency video coding", Recommendation ITU-T H.265 (Jun. 2019).

(Continued)

*Primary Examiner* — Anner Holder
(74) *Attorney, Agent, or Firm* — ScienBiziP, P.C.

(57) ABSTRACT

A method of encoding video data by an electronic device is provided. The method receives the video data including at least one image frame, each including one or more regions. The method signals a first affine flag in a sequence parameter set (SPS) associated with the at least one image frame when an affine mode including affine tools is enabled, and determines that a second affine flag is signaled in the SPS when the first affine flag is equal to one. The method determines that a third affine flag corresponding to an affine prediction refinement with optical flow (PROF) mode is signaled in a slice header associated with a specific region in a specific image frame when the second affine flag is equal to one. The method reconstructs the specific region based on first candidate modes, including the affine PROF mode, when the third affine flag is equal to zero.

19 Claims, 7 Drawing Sheets

(56) References Cited

OTHER PUBLICATIONS

Benjamin Bross et al., "Versatile Video Coding (Draft 6)", JVET-O2001-vE, Joint Video Experts Team (JVET) of ITU-T SG 16 WP 3 and ISO/IEC JTC 1/SC 29/WG 11, 15th Meeting: Gothenburg, SE, Jul. 3-12, 2019.

Jianle Chen et al., "Algorithm description for Versatile Video Coding and Test Model 5 (VTM 5)", JVET-N1002-v2, Joint Video Experts Team (JVET) of ITU-T SG 16 WP 3 and ISO/IEC JTC 1/SC 29/WG 11, 14th Meeting: Geneva, CH, Mar. 19-27, 2019.

Xiaoyu Xiu et al: "CE4-related: Harmonization of BDOF and PROF", Document: JVET-O0593, Joint Video Experts Team (JVET) of ITU-T SG 16 WP 3 and ISO/IECJTC 1/SC 29/WG11, 15th Meeting: Gothenburg, SE, Jul. 3-12, 2019 (Jun. 26, 2019).

Kondo (Sony) K et al: "Non-CE4: Support slice level disabling for PROF", Document: JVET-P0601-v3, Joint Video Experts Team (JVET) of ITU-T SG 16 WP 3 and ISO/IECJTC 1/SC 29/WG11, 16th Meeting: Geneva, CH, Oct. 1-11, 2019 (Oct. 3, 2019).

* cited by examiner

100

DEVICE AND METHOD FOR CODING VIDEO DATA

CROSS-REFERENCE TO RELATED APPLICATION(S)

This application is a continuation application of U.S. patent application Ser. No. 17/836,278, filed on Jun. 9, 2022, which is a continuation application of U.S. patent application Ser. No. 16/987,304, filed on Aug. 6, 2020, issued as U.S. Pat. No. 11,405,648, which claims the benefit of and priority to U.S. Provisional Patent Application Ser. No. 62/884,335, filed on Aug. 8, 2019, the contents of all of which are hereby incorporated herein fully by reference in their entirety for all purposes.

FIELD

The present disclosure generally relates to video coding, and more specifically, to techniques for controlling an affine tool to be enabled or disabled by different syntax structures having different syntax levels for reconstructing image frames in encoded data.

BACKGROUND

In a conventional video coding method, an encoder may encode video data to generate encoded data having multiple flags and provide the encoded data to a decoder. The flags may indicate whether multiple coding modes is enabled or not. For example, the encoded data may include a block-based affine flag indicating whether a block unit is predicted by an affine mode. In addition, the block unit is also refined according to an affine prediction refinement with optical flow (PROF) mode when the block-based affine flag indicates that the block unit is predicted by the affine mode. However, the coding efficiency is not always increased when the affine-predicted blocks are refined according to the affine PROF mode. In other words, the coding efficiency may decrease for some of the block units refined according to the affine PROF mode. Thus, the encoder and the decoder need to have more flags for the affine PROF mode. In addition, the selection of a syntax level of the affine PROF flag is critical to prevent the number of bits in the encoded data from increasing too much.

SUMMARY

The present disclosure is directed to a device and method for disabling an adjustment to an initial prediction result using several flags.

In a first aspect of the present disclosure, a method for decoding a bitstream by an electronic device is provided. The method includes receiving encoded data, as part of the bitstream, for at least one image frame, wherein each of the at least one image frame includes one or more regions; determining a first affine flag from a sequence parameter set (SPS) associated with the at least one image frame when an affine mode is enabled in the at least one image frame, wherein the SPS is included in the encoded data and the affine mode includes multiple affine tools; determining that a second affine flag is present in the SPS when the first affine flag is equal to one; determining that a third affine flag is present in a slice header associated with a specific one of the at least one image frame when the second affine flag is equal to one, wherein the slice header is included in the encoded data, and the third affine flag corresponds to one of the multiple affine tools; and reconstructing the specific one of the one or more regions based on multiple first candidate modes, including the one of the multiple affine tools, when the third affine flag is equal to zero.

In a second aspect of the present disclosure, a method for decoding a bitstream by an electronic device is provided. The method includes receiving encoded data, as part of the bitstream, for at least one image frame, wherein each of the at least one image frame includes one or more regions; determining a first affine flag from a sequence parameter set (SPS) associated with the at least one image frame when an affine mode is enabled in the at least one image frame, wherein the SPS is included in the encoded data and the affine mode includes multiple affine tools; determining, based on the first affine flag, whether a second affine flag is present in the SPS; determining, based on the second affine flag, whether a third affine flag is present in a slice header associated with a specific one of the one or more regions in a specific one of the at least one image frame, wherein the slice header is included in the encoded data, and the third affine flag corresponds to one of the multiple affine tools; and reconstructing the specific one of the one or more regions based on multiple first candidate modes, including the one of the multiple affine tools, when the third affine flag is equal to zero.

In a third aspect of the present disclosure, a method of encoding video data and an electronic device for performing the method are provided. The method includes receiving the video data including at least one image frame, wherein each of the at least one image frame includes one or more regions; signaling a first affine flag in a sequence parameter set (SPS) associated with the at least one image frame when an affine mode is enabled in the at least one image frame, wherein the SPS is included in encoded data and the affine mode includes multiple affine tools; determining that a second affine flag is signaled in the SPS when the first affine flag is equal to one; determining that a third affine flag is signaled in a slice header associated with a specific one of the one or more regions in a specific one of the at least one image frame when the second affine flag is equal to one, wherein: the slice header is included in the encoded data, the third affine flag corresponds to one of the multiple affine tools, the one of the multiple affine tools includes an affine prediction refinement with optical flow (PROF) mode, and the third affine flag includes an affine PROF disabled flag indicating whether the affine PROF mode is disabled when the specific one of the one or more regions associated with the slice header is reconstructed; and reconstructing the specific one of the one or more regions based on multiple first candidate modes, including the one of the multiple affine tools, when the third affine flag is equal to zero.

In a fourth aspect of the present disclosure, a method of encoding video data performed by an electronic device is provided. The method includes receiving the video data including at least one image frame, wherein each of the at least one image frame includes one or more regions; signaling a first affine flag in a sequence parameter set (SPS) associated with the at least one image frame when an affine mode is enabled in the at least one image frame, wherein the SPS is included in encoded data and the affine mode includes multiple affine tools; determining, based on the first affine flag, whether a second affine flag is signaled in the SPS; determining, based on the second affine flag, whether a third affine flag is signaled in a slice header associated with a specific one of the one or more regions in a specific one of the at least one image frame, wherein: the slice header is included in the encoded data, the third affine flag corresponds to one of the multiple affine tools, the one of the multiple affine tools includes an affine prediction refinement with optical flow (PROF) mode, and the third affine flag includes an affine PROF disabled flag indicating whether the affine PROF mode is disabled when the specific one of the one or more regions associated with the slice header is reconstructed; and reconstructing the specific one of the one or more regions based on multiple first candidate modes, including the one of the multiple affine tools, when the third affine flag is equal to zero.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DETAILED DESCRIPTION

Figure 1:
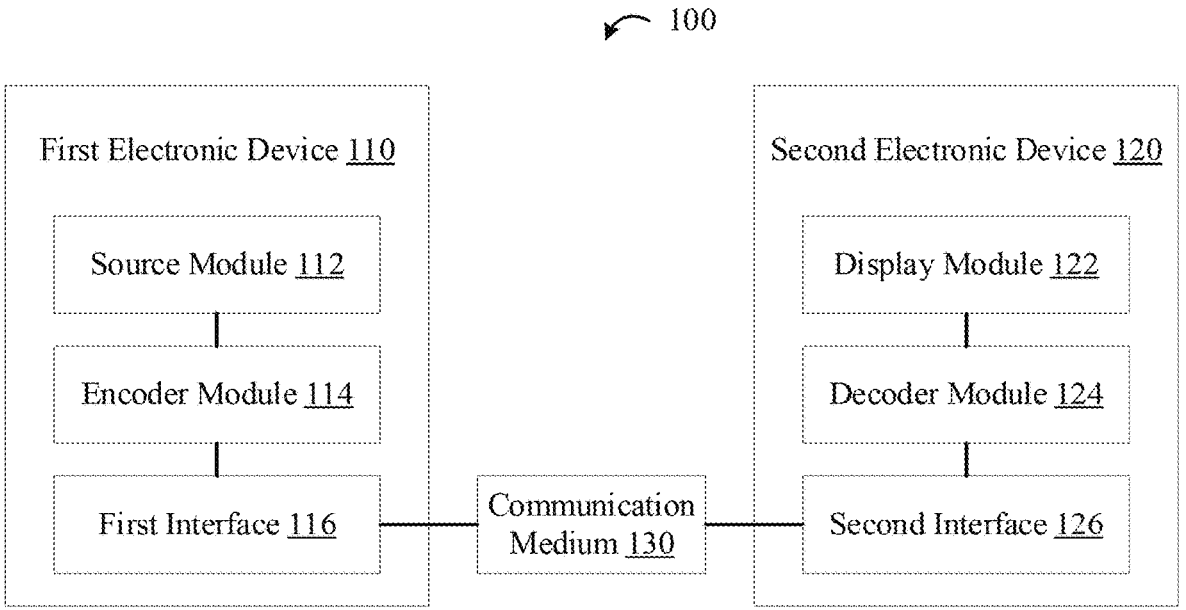
FIG. 1 is a block diagram illustrating a system having a first electronic device and a second electronic device for encoding and decoding video data, in accordance with one or more example implementations of this disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly through intervening components, and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having one or more computer-executable instructions stored on a computer-readable medium, such as memory or other types of storage devices. For example, one or more microprocessors or general-purpose computers with communication processing capability may be programmed with computer-executable instructions and perform the disclosed function(s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-executable instructions. The computer-readable medium may be a non-transitory computer-readable medium.

FIG. 1 is a block diagram illustrating a system 100 having a first electronic device and a second electronic device for encoding and decoding video data, in accordance with one or more example implementations of this disclosure.

The system 100 includes a first electronic device 110, a second electronic device 120, and a communication medium 130.

The first electronic device 110 may be a source device including any device configured to encode video data and transmit the encoded video data to the communication medium 130. The second electronic device 120 may be a destination device including any device configured to receive encoded video data via the communication medium 130 and decode the encoded video data.

The first electronic device 110 may communicate via wire, or wirelessly, with the second electronic device 120 via the communication medium 130. The first electronic device 110 may include a source module 112, an encoder module 114, and a first interface 116, among other components. The second electronic device 120 may include a display module 122, a decoder module 124, and a second interface 126, among other components. The first electronic device 110 may be a video encoder and the second electronic device 120 may be a video decoder.

The first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive the video from a video content provider. The source module 112 may generate computer graphics-based data, as the source video, or may generate a combination of live video, archived video, and computer-generated video, as the source video. The video capture device may include a charge-coupled device (CCD) image sensor, a complementary metal-oxide-semiconductor (CMOS) image sensor, or a camera.

The encoder module 114 and the decoder module 124 may each be implemented as any one of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having computer-executable instructions for the software in a suitable, non-transitory computer-readable medium and execute the stored computer-executable instructions using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB, or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE), or Time-Division LTE (TD-LTE). The first interface 116 and the second interface 126 may each include any device configured to transmit a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure(s) that may be used to interconnect peer devices.

The display module 122 may include a display using liquid crystal display (LCD) technology, plasma display technology, organic light-emitting diode (OLED) display technology, or light-emitting polymer display (LPD) technology, with other display technologies used in some other implementations. The display module 122 may include a High-Definition display or an Ultra-High-Definition display.

Figure 2:
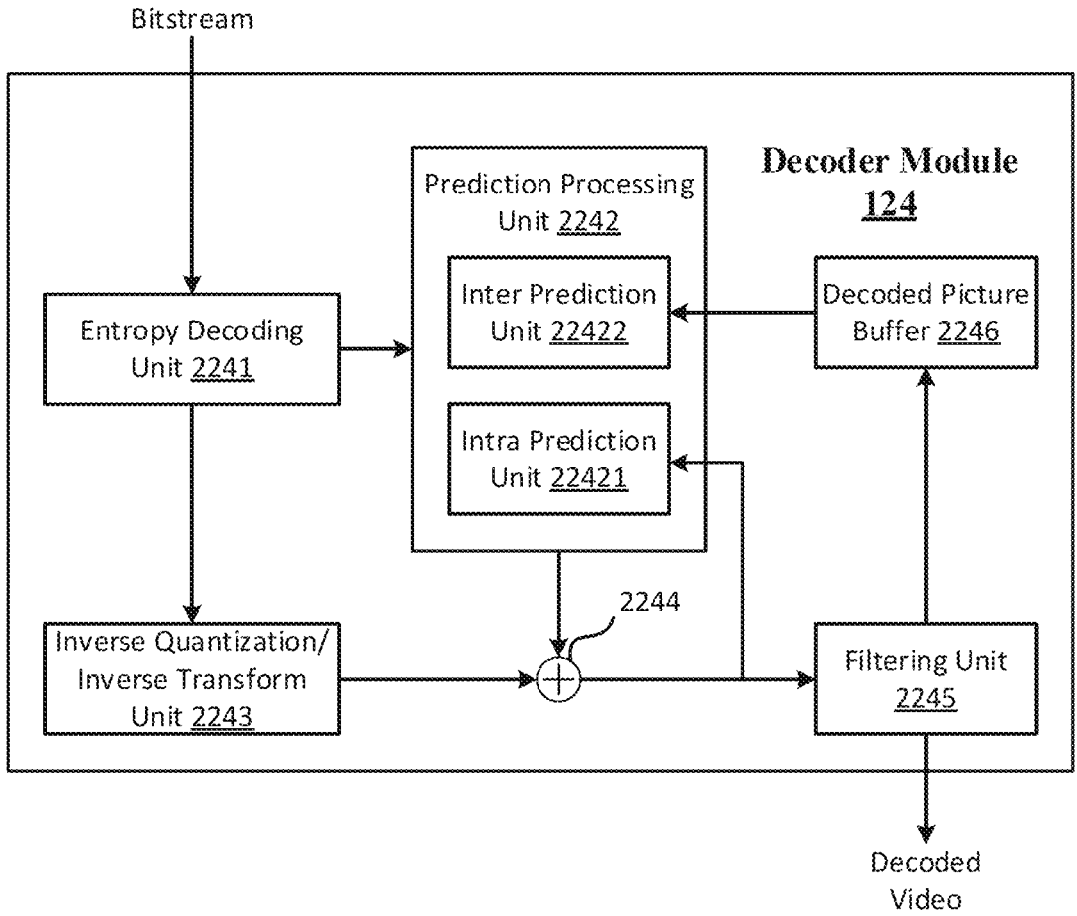
FIG. 2 is a block diagram illustrating a decoder module of the second electronic device illustrated in FIG. 1, in accordance with one or more example implementations of this disclosure.

FIG. 2 is a block diagram illustrating a decoder module 124 of the second electronic device 120 illustrated in FIG. 1, in accordance with one or more example implementations of this disclosure. The decoder module 124 may include an entropy decoder (e.g., an entropy decoding unit 2241), a prediction processor (e.g., a prediction processing unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction processing unit 2242 further may include an intra prediction processor (e.g., an intra prediction unit 22421) and an inter prediction processor (e.g., an inter prediction unit 22422). The decoder module 124 receives a bitstream, decodes the bitstream, and outputs a decoded video.

The entropy decoding unit 2241 may receive the bitstream including multiple syntax elements from the second interface 126, as shown in FIG. 1, and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and/or other syntax information.

The entropy decoding unit 2241 may perform context-adaptive variable length coding (CAVLC), context-adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction processing unit 2242.

The prediction processing unit 2242 may receive syntax elements, such as motion vectors, intra modes, partition information, and other syntax information, from the entropy decoding unit 2241. The prediction processing unit 2242 may receive the syntax elements including the partition information and divide image frames according to the partition information.

Each of the image frames may be divided into at least one image block, according to the partition information. The at least one image block may include a luminance block for reconstructing multiple luminance samples and at least one chrominance block for reconstructing multiple chrominance samples. The luminance block and the at least one chrominance block may be further divided to generate macroblocks, coding tree units (CTUs), coding blocks (CBs), subdivisions thereof, and/or other equivalent coding units.

During the decoding process, the prediction processing unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame, as the current block unit, based on syntax elements related to the intra mode, in order to generate a predicted block. The intra mode may specify the location of reference samples selected from the neighboring blocks within the current frame. The intra prediction unit 22421 may reconstruct multiple chroma components of the current block unit, based on multiple luma components of the current block unit, when the multiple chroma components is reconstructed by the prediction processing unit 2242.

The intra prediction unit 22421 may reconstruct multiple chroma components of the current block unit based on the multiple luma components of the current block unit when the multiple luma components of the current block unit is reconstructed by the prediction processing unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit may be a block determined to closely match the current block unit. The inter prediction unit 22422 may receive the reference image block stored in the decoded picture buffer 2246 and reconstruct the current block unit based on the received reference image block.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process, such as a discrete cosine transform (DCT), a discrete sine transform (DST), an adaptive multiple transform (AMT), a mode-dependent non-separable secondary transform (MDNSST), a Hypercube-Givens transform (HyGT), a signal-dependent transform, a Karhunen-Loeve transform (KLT), a wavelet transform, an integer transform, a sub-band transform, or a conceptually similar transform. The inverse transformation may convert the residual information from a transform domain, such as a frequency domain, back to the pixel domain, etc. The degree of inverse quantization may be modified by adjusting a quantization parameter.

The summer 2244 may add the reconstructed residual block to the predicted block, provided by the prediction processing unit 2242, to produce a reconstructed block.

The filtering unit 2245 may include a deblocking filter, a sample adaptive offset (SAO) filter, a bilateral filter, and/or an adaptive loop filter (ALF) to remove the blocking artifacts from the reconstructed block. Additional filters (in loop or post loop) may also be used in addition to the deblocking filter, the SAO filter, the bilateral filter, and the ALF. Such filters (are not explicitly illustrated for brevity of the description) may filter the output of the summer 2244. The filtering unit 2245 may output the decoded video to the display module 122, or other video receiving units, after the filtering unit 2245 performs the filtering process for the reconstructed blocks of the specific image frame.

The decoded picture buffer 2246 may be a reference picture memory that stores the reference block to be used by the prediction processing unit 2242 in decoding the bitstream (e.g., in inter-coding modes). The decoded picture buffer 2246 may be formed by any one of a variety of memory devices, such as a dynamic random-access memory (DRAM), including synchronous DRAM (SDRAM), magneto-resistive RAM (MRAM), resistive RAM (RRAM), or other types of memory devices. The decoded picture buffer 2246 may be on-chip along with other components of the decoder module 124, or may be off-chip relative to those components.

Figure 3:
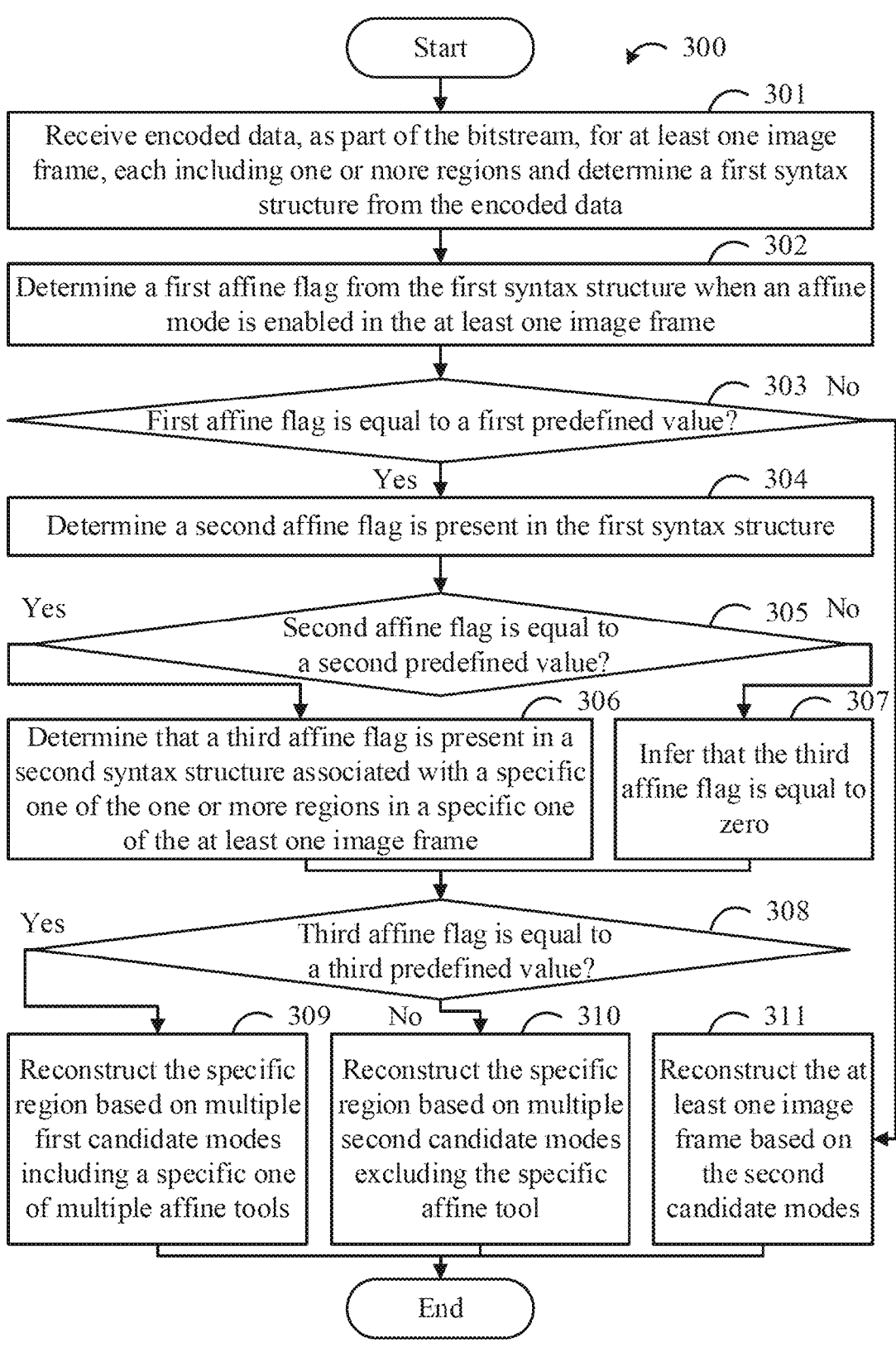
FIG. 3 is a flowchart illustrating a method/process for decoding and/or encoding video data by an electronic device, in accordance with one or more example implementations of this disclosure.

FIG. 3 is a flowchart illustrating a method/process 300 for decoding and/or encoding video data by an electronic device, in accordance with one or more example implementations of this disclosure. The method/process 300 is an example implementation, as there may be a variety of ways of decoding the video data.

The method/process 300 may be performed by an electronic device using the configurations illustrated in FIGS. 1 and/or 2, where various elements of these figures may be referenced to describe the method/process 300. Each block illustrated in FIG. 3 may represent one or more processes, methods, or subroutines performed by an electronic device.

The order in which the blocks appear in FIG. 3 is for illustration only, and may not be construed to limit the scope of the present disclosure, thus the order may be different from what is illustrated. Additional blocks may be added or fewer blocks may be utilized without departing from the scope of the present disclosure.

At block 301, the method/process 300 may start by the decoder module 124 receiving encoded data, as part of a bitstream, for at least one image frame, each including one or more regions and determines a first syntax structure from the encoded data.

With reference to FIGS. 1 and 2, the second electronic device 120 may receive the bitstream from an encoder, such as the first electronic device 110 (or other video providers) via the second interface 126. The second interface 126 may directly provide the bitstream to the decoder module 124 in some implementations.

Figure 4A:
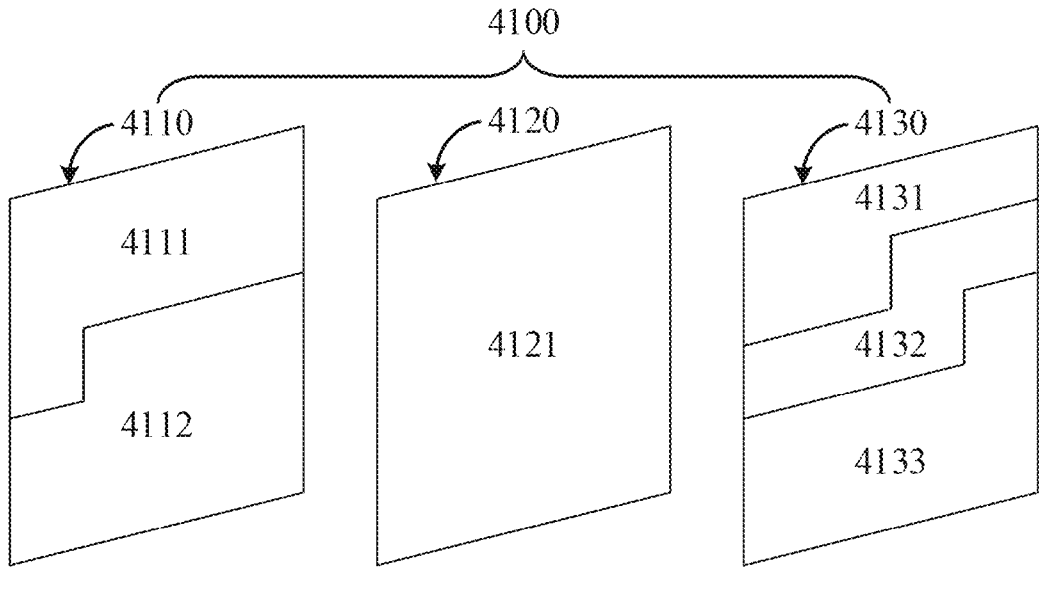
FIG. 4A is a schematic illustration of an image group of three image frames having one or more regions, in accordance with one or more example implementations of this disclosure.

FIG. 4A is a schematic illustration of an image group of three image frames having one or more regions, in accordance with one or more example implementations of this disclosure. In the implementation, the number of at least one image frame 4110-4130 in an image group 4100 corresponding to the encoded data may be equal to three, the number of one or more regions in the first image frame 4110 is equal to two, the number of one or more regions in the second image frame 4120 is equal to one, and the number of one or more regions in the third image frame 4130 is equal to three.

In some implementations, the encoded data may include the first syntax structure corresponding to the at least one image frame. In the implementation, the first syntax structure may include multiple first structure indications to indicate how to reconstruct the at least one image frame. In some implementations, the first syntax structure may be one of a video parameter set (VPS), a sequence parameter set (SPS) and a picture parameter set (PPS).

In some implementations, the entropy decoding unit 2241 may decode the encoded data to determine the first structure indications for the at least one image frame and the decoder module 124 may further reconstruct the at least one image frame based on the first structure indications. The first structure indications may include multiple first structure flags and multiple first structure indices.

At block 302, the decoder module 124 may determine a first affine flag from the first syntax structure when an affine mode is enabled in the at least one image frame.

In some implementations, with reference to FIG. 2, the decoder module 124 may determine an affine enabled flag from the first syntax structure. In the implementation, an affine mode may be enabled during reconstruction of the at least one image frame corresponding to the first syntax structure, when the affine enabled flag in the first syntax structure is equal to one. In some implementations, the affine mode may include multiple affine tools. Thus, the affine tools may be enabled during reconstruction of the at least one image frame, when the affine enabled flag is equal to one. In addition, the affine mode may be disabled for the at least one image frame, when the affine enabled flag in the first syntax structure is equal to zero. Thus, the at least one image frame is not reconstructed based on the affine tools when the affine enabled flag is equal to zero. In some implementations, the affine enabled flag may be a syntax element sps_affine_enabled_flag when the first syntax structure is the SPS.

In some implementations, the first affine flag may indicate whether a specific one of the affine tools is enabled for the at least one image frame when the affine mode is enabled in the at least one image frame according to the affine enabled flag. In the implementation, the first affine flag corresponds to the specific affine tool.

In some implementations, the specific affine tool may be an affine PROF mode. In addition, the first affine flag may be an affine PROF enabled flag indicating whether the affine PROF mode is enabled when the at least one image frame is reconstructed. In one implementation, the affine PROF enabled flag may be a syntax element sps_affine_prof_en-abled_flag, when the first syntax structure is the SPS.

In some implementations, the specific affine tool may be an affine adaptive motion vector difference resolution (AMVR) mode. In addition, the first affine flag may be an affine AMVR enabled flag indicating whether the affine AMVR mode is enabled when the at least one image frame is reconstructed. In one implementation, the affine AMVR enabled flag may be a syntax element sps_affine_amvr_en-abled_flag, when the first syntax structure is the SPS.

At block 303, the decoder module 124 may determine whether the first affine flag is equal to a first predefined value. The method 300 may proceed to block 304 when the decoder module 124 determines that the first affine flag is equal to the first predefined value. The method may proceed to block 311 when the decoder module 124 determines that the first affine flag is different from the first predefined value.

In some implementations, with reference to FIG. 2, the decoder module 124 determines that the specific affine tool is enabled for the at least one image frame when the first affine flag is equal to the first predefined value. In addition, the decoder module 124 determines that the specific affine tool is disabled during reconstruction of the at least one image frame when the first affine flag is different from the first predefined value. In other words, the at least one image frame is not reconstructed based on the specific affine tool when the first affine flag is different from the first predefined value.

In some implementations, the first predefined value may be equal to one. Thus, the decoder module 124 determines that the specific affine tool is enabled for the at least one image frame when the first affine flag is equal to one. In addition, the decoder module 124 determines that the specific affine tool is disabled during reconstruction of the at least one image frame when the first affine flag is equal to zero.

At block 304, the decoder module 124 may determine that a second affine flag is present in the first syntax structure.

In some implementations, with reference to FIG. 2, the decoder module 124 may determine that the first syntax structure includes the second affine flag when the first affine flag is equal to the first predefined value. Then, the decoder module 124 may determine the second affine flag from the first syntax structure when the first affine flag is equal to the first predefined value. In one implementation, the first pre-defined value is equal to one. Thus, the decoder module 124 may determine the second affine flag from the first syntax structure when the first affine flag is equal to one.

In some implementations, the second affine flag may indicate whether the encoded data further includes multiple secondary flags each indicating whether the specific affine tool is disabled during reconstruction of a specific one of the regions in a specific one of the at least one image frame when the specific affine tool is enabled in the at least one image frame according to the first affine flag. In the imple-mentation, the second affine flag corresponds to the specific affine tool.

In some implementations, the specific affine tool may be the affine PROF mode. In addition, the second affine flag may be an affine PROF present flag indicating whether the encoded data further includes the secondary flag indicating whether the affine PROF mode is disabled during recon-struction of one of the regions included in one of the at least one image frame. In the implementation, the secondary flag corresponds to the one of the regions in the one of the at least one image frame. In some other implementations, the second affine flag may be an affine AMVR present flag.

At block 305, the decoder module 124 may determine whether the second affine flag is equal to a second predefined value. The method 300 may proceed to block 306 when the decoder module 124 determines that the second affine flag is equal to the second predefined value. The method may proceed to block 307 when the decoder module 124 deter-mines that the second affine flag is different from the second predefined value.

In some implementations, with reference to FIG. 2, the decoder module 124 determines that the encoded data fur-ther includes the secondary flags each indicating whether the specific affine tool is disabled during reconstruction of the corresponding region when the second affine flag is equal to the second predefined value. In addition, the decoder module 124 determines that the encoded data does not include the secondary flags when the second affine flag is different from the second predefined value. In other words, the secondary flags are not parsed from the encoded data when the second affine flag is different from the second predefined value.

In some implementations, the second predefined value may be equal to one. Thus, the decoder module 124 deter-mines that the encoded data further includes the secondary flags when the second affine flag is equal to one. In addition, the decoder module 124 determines that the secondary flags are not included in the encoded data when the second affine flag is equal to zero.

At block 306, the decoder module 124 may determine that a third affine flag is present in a second syntax structure associated with a specific one of the one or more regions in a specific one of the at least one image frame.

In some implementations, each of the secondary flags is the third affine flag included in a corresponding one of multiple second syntax structures. In some implementations, the encoded data may include the first syntax structure and the second syntax structures. In addition, the number of first syntax structure in the encoded data may be equal to one, and the number of second syntax structures in the encoded data may be equal to the number of regions included in the at least one image frame. In some implementations, with reference to FIG. 4A, the number of first syntax structure corresponding to the image group 4100 is equal to one, and the number of second syntax structures each corresponding to one of the regions 4111-4112, 4121, and 4131-4133 in the image group 4100 is equal to six.

Figure 4B:
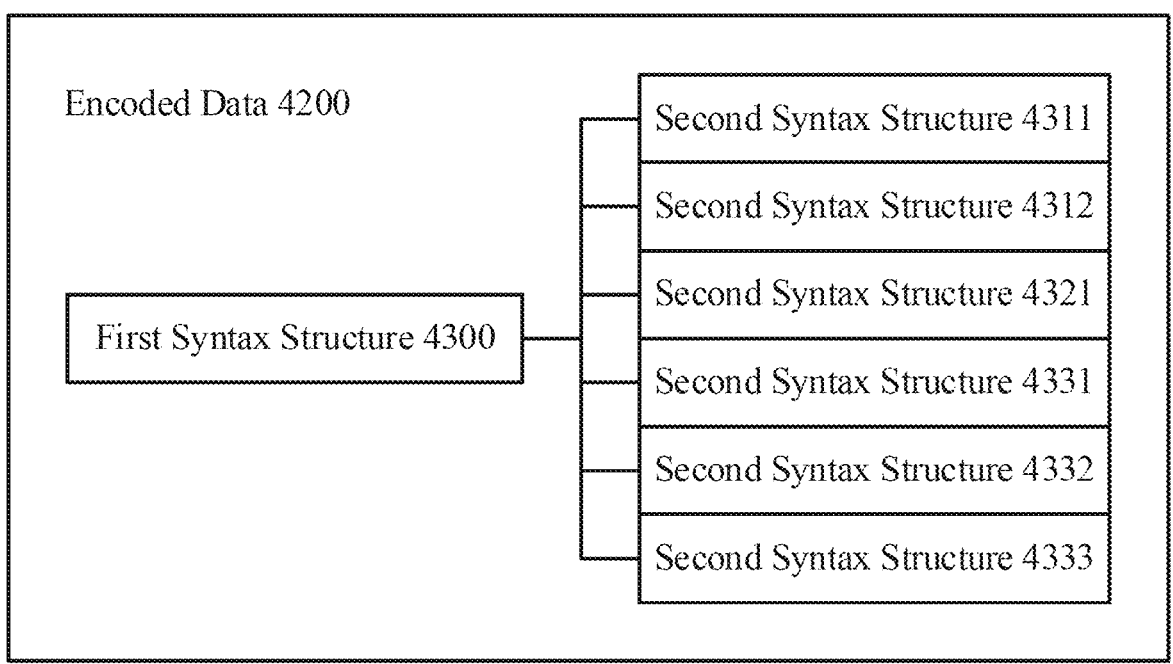
FIG. 4B is a schematic illustration of syntax structures corresponding to the image group and image regions illustrated in FIG. 4A, in accordance with one or more example implementations of this disclosure.

FIG. 4B is a schematic illustration of syntax structures corresponding to the image group and image regions illustrated in FIG. 4A, in accordance with one or more example implementations of this disclosure. The syntax structure may include one first syntax structure corresponding to the image group 4100 and six second syntax structures corresponding to the six regions 4111-4112, 4121, and 4131-4133 in the image group 4100. In the implementation, each of the second syntax structures 4311-4312, 4321, and 4331-4333 corresponds to one of the regions 4111-4112, 4121, and 4131-4133 in the image group 4100. Thus, the number of regions 4111-4112, 4121, and 4131-4133 in the image group 4100 may be equal to the number of second syntax structures 4311-4312, 4321, and 4331-4333.

In some implementations, a first syntax level of the first syntax structure 4300 is higher than a second syntax level of the second syntax structures 4311-4312, 4321, and 4331-4333. In the implementation, each of the second syntax structures 4311-4312, 4321, and 4331-4333 may have a reference to the first syntax structure 4300, and the first syntax structure 4300 has no reference to the second syntax structures 4311-4312, 4321, and 4331-4333. For example, the second syntax structures 4311-4312, 4321, and 4331-4333 may be a slice header. In another example, the second syntax structure 4321 may be a picture header and there may be another two second syntax structures each corresponding to one of the image frames 4110 and 4130 in the encoded data 4200.

In some implementations, with reference to FIG. 2, the decoder module 124 determines that each of the second syntax structures includes one of the third affine flags when the second affine flag is equal to the second predefined value. Then, the decoder module 124 may determine the third affine flags from the second syntax structures when the second affine flag is equal to the second predefined value. In the implementation, each of the third affine flags may indicate whether the specific affine tool is disabled when a corresponding one of the regions is reconstructed. In one implementation, the second predefined value is equal to one. Thus, the decoder module 124 may determine one of the third affine flags from a corresponding one of second syntax structures corresponding to a specific one of the one or more regions in a specific one of the at least one image frame when the second affine flag is equal to one. For example, the decoder module 124 may determine one of the affine flags from the second syntax structure 4331 corresponding to the region 4131 of the third image frame 4130.

In some implementations, each of the third affine flags included in a corresponding one of the second syntax structures also corresponds to one of the regions in the at least one image frame, since each of the second syntax structures corresponds to one of the regions in the at least one image frame.

In some implementations, the third affine flags correspond to the specific affine tool, since the third affine flags indicate whether the specific affine tool is disabled in the regions in the at least one image frame.

In some implementations, the specific affine tool may be the affine PROF mode. In addition, each of the third affine flags may be an affine PROF disabled flag indicating whether the affine PROF mode is disabled when a corresponding one of the regions included in a corresponding one of the at least one image frame is reconstructed. In one implementation, the affine PROF disabled flag may be a syntax element ph_prof_disabled_flag, when the second syntax structure is the picture header. In addition, the affine PROF present flag may be a syntax element sps_prof_control_present_in_ph_flag, when the first syntax structure is the SPS and the second syntax structure is the picture header. In the implementation, the second affine flag may be the affine present flag indicating whether the affine PROF disabled flags are included in the second syntax structures.

In some implementations, the specific affine tool may be the affine AMVR mode. In addition, each of the third affine flags may be an affine AMVR disabled flag. In the implementation, the second affine flag may be the affine present flag indicating whether the affine AMVR disabled flags are included in the second syntax structures.

At block 307, the decoder module 124 may infer that the third affine flag is equal to zero.

In some implementations, with reference to FIG. 2, the decoder module 124 determines that the third affine flags are not present in the second syntax structures when the second affine flag is different from the second predefined value. Then, the decoder module 124 infers that the third affine flags for the regions in the at least one image frame are equal to zero when the third affine flags are not present in the second syntax structures and the second affine flag is present in the first syntax structure.

In some implementations, the second predefined value may be equal to one. Thus, the decoder module 124 determines that the third affine flags are not parsed from the second syntax structures when the second affine flag is equal to zero. In addition, the third affine flags are inferred to be equal to zero when the second affine flag is equal to zero and the second affine flag is present in the first syntax structure.

At block 308, the decoder module 124 may determine whether the third affine flag is equal to a third predefined value. The method 300 may proceed to block 309 when the decoder module 124 determines that the third affine flag is equal to the third predefined value. The method may proceed to block 310 when the decoder module 124 determines that the third affine flag is different from the third predefined value.

In some implementations, with reference to FIG. 2, the decoder module 124 determines that the specific affine tool is enabled in a specific one of the regions when the third affine flag corresponding to the specific region is equal to the third predefined value. In addition, the decoder module 124 determines that the specific affine tool is disabled in the specific region when the third affine flag corresponding to the specific region is different from the third predefined value. In other words, the specific region may not be reconstructed based on the specific affine tool when the third affine flag is different from the third predefined value.

In some implementations, the third predefined value may be equal to zero. Thus, the decoder module 124 determines that the specific affine tool is enabled for the specific region when the third affine flag is equal to zero. In addition, the decoder module 124 determines that the specific affine tool is disabled in the specific region when the third affine flag is equal to one.

At block 309, the decoder module 124 may reconstruct the specific region based on multiple first candidate modes including a specific one of multiple affine tools.

In some implementations, with reference to FIG. 2, the decoder module 124 may determine that the specific affine tool is enabled in the specific region when the third affine flag corresponding to the specific region is equal to the third predefined value. Thus, the specific region may be reconstructed based on the first candidate mode including the specific affine tool when the third affine flag is equal to the third predefined value.

In some implementations, the specific affine tool is the affine PROF mode, and the third predefined value is equal to zero. In the implementation, the decoder module 124 may determine that the affine PROF mode is enabled in the specific region when the third affine PROF disabled flag is equal to zero. Thus, the decoder module 124 may determine, from a third syntax structure, a block flag for a block unit included in the specific region. The block flag indicates whether the block unit is predicted by the affine mode. When the block flag is equal to one, the decoder module 124 may determine that the block unit is predicted by the affine mode. Thus, the decoder module 124 may predict the block unit based on the affine mode to generate the prediction block, and then refine the prediction block according to the affine PROF mode. In the implementation, the decoder module 124 may reconstruct the block unit by adding the refined block into a residual block of the block unit determined from the bitstream.

In some implementations, the third syntax structure is a block-based syntax corresponding to the block unit. Thus, the third syntax structure is different from the first syntax structure and the second syntax structure, and a third syntax level of the third syntax structure is lower than the first syntax level and the second syntax level.

In some implementations, the decoder module 124 may determine that the block unit is not predicted by the affine mode when the block flag is equal to zero. Thus, the decoder module 124 may predict the block unit based on another prediction mode different from the affine mode to generate the prediction block. Then, the prediction block is not refined according to the affine PROF mode. In the implementation, the decoder module 124 may reconstruct the block unit by adding the prediction block into the residual block of the block unit determined from the bitstream.

At block 310, the decoder module 124 may reconstruct the specific region based on multiple second candidate modes excluding the specific affine tool.

In some implementations, with reference to FIG. 2, the decoder module 124 may determine that the specific affine tool is disabled in the specific region when the third affine flag corresponding to the specific region is different from the third predefined value. Thus, the specific region may be reconstructed based on the second candidate modes excluding the specific affine tool when the third affine flag is different from the third predefined value. In one implementation, the third predefined value is equal to zero. In the implementation, the decoder module 124 may determine that the specific affine tool is disabled in the specific region when the third affine flag is equal to one. In addition, the specific region may be reconstructed based on the second candidate modes. In the implementation, the specific affine tool is excluded from the first candidate modes to generate the second candidate modes.

In some implementations, the specific affine tool is the affine PROF mode, and the third affine flag is the affine PROF disabled flag. In the implementation, the decoder module 124 may determine that the affine PROF mode is disabled in the specific region when the third affine PROF disabled flag is equal to one. Thus, the decoder module 124 may determine that multiple prediction blocks for multiple block units in the specific region are not refined according to the affine PROF mode when the specific region is reconstructed. In the implementation, the specific region is reconstructed based on the second candidate modes excluding the affine PROF mode. In the implementation, the affine PROF mode is excluded from the first candidate modes to generate the second candidate modes. For example, the decoder module 124 may predict one block unit in the specific region to generate one prediction block based on the affine mode without additional refining of the prediction block according to the affine PROF mode, and then directly add the prediction block into the residual block of the block unit to reconstruct the block unit.

At block 311, the decoder module 124 may reconstruct the at least one image frame based on the second candidate modes.

In some implementations, with reference to FIG. 2, the decoder module 124 may determine that the specific affine tool is disabled in the at least one image frame when the first affine flag is different from the first predefined value. Thus, the at least one image frame may be reconstructed based on the second candidate modes excluding the specific affine tool when the first affine flag is different from the first predefined value. In one implementation, the first predefined value is equal to one. In the implementation, the decoder module 124 may determine that the specific affine tool is disabled in the at least one image frame when the first affine flag is equal to zero. In addition, the at least one image frame may be reconstructed based on the second candidate modes when the first affine flag is equal to zero.

In some implementations, the specific affine tool is the affine PROF mode, and the first affine flag is the affine PROF enabled flag. In the implementation, the decoder module 124 may determine that the affine PROF mode is disabled in the at least one image frame when the first affine PROF enabled flag is equal to zero. Thus, the decoder module 124 may determine that the prediction blocks for the block units in the at least one image frame are not refined according to the affine PROF mode when the at least one image frame is reconstructed. In the implementation, the at least one image frame is reconstructed based on the second candidate modes excluding the affine PROF mode. In the implementation, the affine PROF mode is excluded from the first candidate modes to generate the second candidate modes. For example, the decoder module 124 may predict one block unit in the specific region to generate one prediction block based on the affine mode without additional refining of the prediction block according to the affine PROF mode, and then directly add the prediction block into the residual block of the block unit to reconstruct the block unit.

In some implementations, with reference to FIG. 2, the decoder module 124 determines that the second affine flag is not present in the first syntax structure when the first affine flag is different from the first predefined value. Then, the decoder module 124 infers that the second affine flag for the at least one image frame is equal to zero when the second affine flags are not present in the first syntax structures. In the implementation, the third affine flags are not present in the second syntax structure, since the second affine flag is inferred to be equal to zero. Thus, the third affine flags are not parsed from the second syntax structures. In the implementation, the decoder module 124 may infer that the third affine flags are equal to one for disabling the specific affine mode since the first affine flag is different from the first predefined value for indicating that the specific affine mode is disabled in the at least one image frame.

In some implementations, the specific affine tool is the affine PROF mode and the first affine flag is the affine PROF enabled flag. Thus, the decoder module 124 determines that the second affine flag is not parsed from the first syntax structure when the affine PROF enabled flag is equal to zero. In addition, the second affine flags are inferred to be equal to zero when the affine PROF enabled flag is equal to zero. Then, the decoder module 124 infers that the second affine flag for the at least one image frame is equal to zero when the second affine flags are not present in the first syntax structures. In the implementation, the third affine flags are not present in the second syntax structure, since the second affine flag is inferred to be equal to zero. Thus, the third affine flags are not parsed from the second syntax structures. In the implementation, the decoder module 124 may infer that the third affine flags are equal to one for disabling the specific affine mode since the affine PROF enabled flag is equal to zero for indicating that the affine PROF mode is disabled in the at least one image frame. The method/process 300 may then end.

Figure 5:
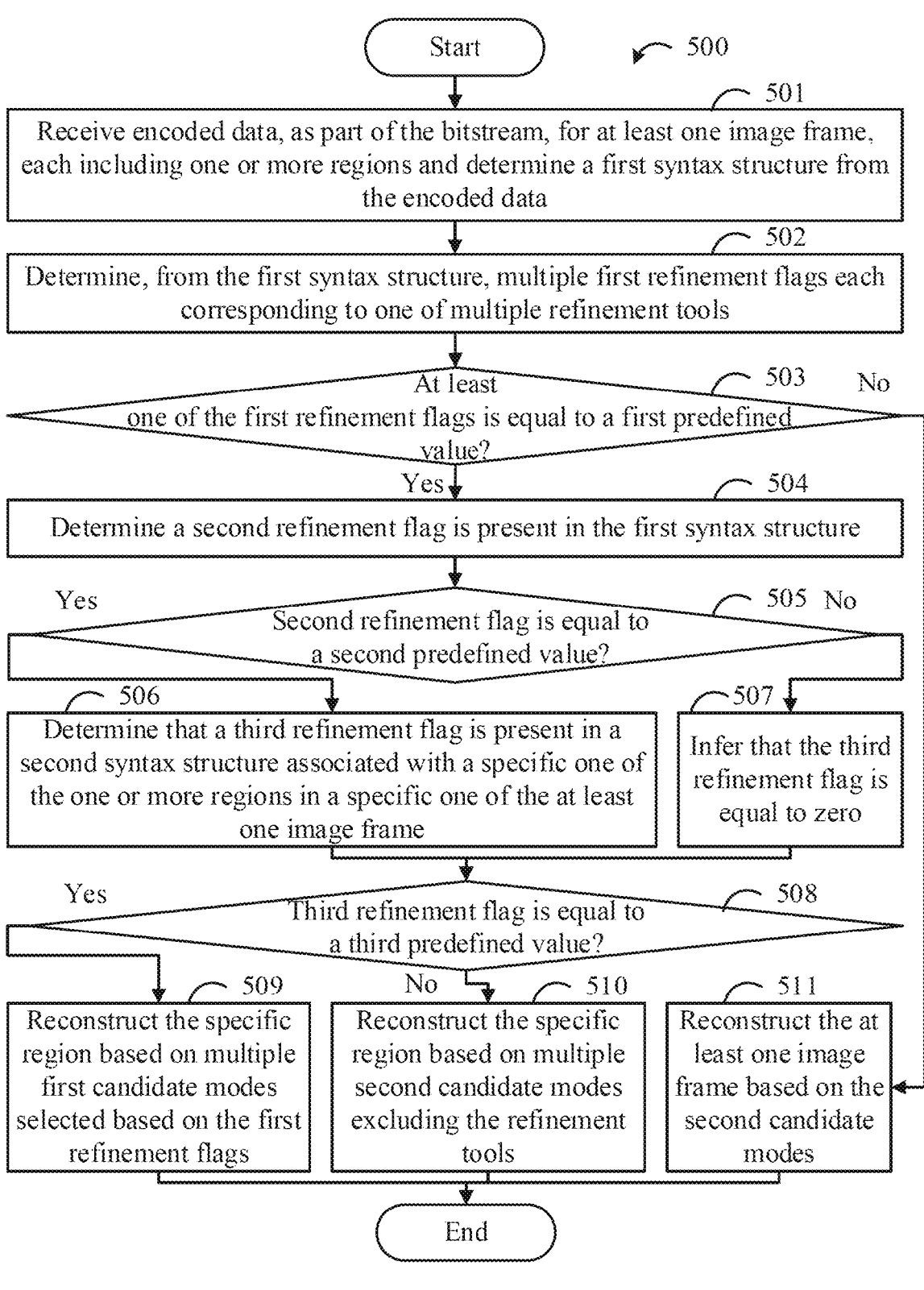
FIG. 5 is a flowchart illustrating another method/process for decoding and/or encoding video data by an electronic device, in accordance with one or more example implementations of this disclosure.

FIG. 5 is a flowchart illustrating a method/process 500 for decoding and/or encoding video data by an electronic device, in accordance with one or more example implementations of this disclosure. The method/process 500 is an example implementation, as there may be a variety of ways of decoding the video data.

The method/process 500 may be performed by an electronic device using the configurations illustrated in FIGS. 1 and/or 2, where various elements of these figures may be referenced to describe the method/process 500. Each block illustrated in FIG. 5 may represent one or more processes, methods, or subroutines performed by an electronic device.

The order in which the blocks appear in FIG. 5 is for illustration only, and may not be construed to limit the scope of the present disclosure, thus may be different from what is illustrated. Additional blocks may be added or fewer blocks may be utilized without departing from the scope of the present disclosure.

At block 501, the method/process 500 may start by the decoder module 124 receiving encoded data, as part of a bitstream, for at least one image frame, each including one or more regions and determines a first syntax structure from the encoded data.

With reference to FIGS. 1 and 2, the second electronic device 120 may receive the bitstream from an encoder, such as the first electronic device 110 (or other video providers), via the second interface 126. The second interface 126 may directly provide the bitstream to the decoder module 124 in some implementations. The bitstream may include the encoded data corresponding to the at least one image frame. Each of the at least one image frame may be divided into one or more regions.

In some implementations, the encoded data may include the first syntax structure corresponding to the at least one image frame. In the implementation, the first syntax structure may include multiple first structure indications to indicate how to reconstruct the at least image frame. In some implementations, the first syntax structure may be one of a VPS, an SPS and a PPS.

In some implementations, the entropy decoding unit 2241 may decode the encoded data to determine the first structure indications for the at least one image frame and the decoder module 124 may further reconstruct the at least one image frame based on the first structure indications. The first structure indications may include multiple first structure flags and multiple first structure indices.

At block 502, the decoder module 124 may determine, from the first syntax structure, multiple first refinement flags each corresponding to one of multiple refinement tools.

In some implementations, each of the first refinement flags may indicate whether a corresponding one of refinement tools is enabled for the at least one image frame. In some implementations, the refinement tools may include more than one of a bi-directional optical flow (BDOF) mode, a decoder motion vector refinement (DMVR) mode, an affine PROF mode, and other prediction refinement modes. In addition, each of the first refinement flags may be a refinement enabled flag indicating whether a corresponding one of the refinement tools is enabled when the at least one image frame is reconstructed. In one implementation, each of the refinement enabled flags may be a syntax element sps_refinement_enabled_flag, when the first syntax structure is the SPS. For example, the refinement enabled flags may include more than one of a syntax element sps_bdof_enabled_flag, a syntax element sps_dmvr_enabled_flag, syntax element sps_affine_prof_enabled_flag.

At block 503, the decoder module 124 may determine whether at least one of the first refinement flags is equal to a first predefined value. The method 500 may proceed to block 504 when the decoder module 124 determines that one or more of the first refinement flags are equal to the first predefined value. The method may proceed to block 511 when the decoder module 124 determines that each of the first refinement flags is different from the first predefined value.

In some implementations, with reference to FIG. 2, the decoder module 124 determines that at least one of the refinement tools is enabled for the at least one image frame when at least one of the first refinement flags is equal to the first predefined value. In addition, the decoder module 124 determines that all the refinement tools are disabled during reconstruction of the at least one image frame when each of the first refinement flags is different from the first predefined value. In other words, the at least one image frame is not reconstructed based on the refinement tools when the first refinement flags are different from the first predefined value.

In some implementations, the first predefined value may be equal to one. Thus, the decoder module 124 determines that one of the refinement tools is enabled for the at least one image frame when one of the first refinement flags is equal to one. In addition, the decoder module 124 determines that the refinement tools are disabled during reconstruction of the at least one image frame when all of the first refinement flags are equal to zero.

At block 504, the decoder module 124 may determine that a second refinement flag is present in the first syntax structure.

In some implementations, with reference to FIG. 2, the decoder module 124 may determine that the first syntax structure includes the second refinement flag when at least one of the first refinement flags is equal to the first predefined value. Then, the decoder module 124 may determine the second refinement flag from the first syntax structure. In one implementation, the first predefined value is equal to one. Thus, the decoder module 124 may determine the second refinement flag from the first syntax structure when at least one of the first refinement flags is equal to one.

In some implementations, the second refinement flag may indicate whether the encoded data further includes multiple secondary flags each indicating whether all of the refinement tools are disabled during reconstruction of a corresponding one of the regions in the at least one image frame when at least one of the refinement tools is enabled in the at least one image frame according to the first refinement flags.

In some implementations, the second refinement flag may be a refinement present flag indicating whether the encoded data further includes the secondary flag indicating whether the refinement tools are disabled during reconstruction of one of the regions included in the at least one image frame. In the implementation, the secondary flag corresponds to the one of the regions in the at least one image frame.

At block 505, the decoder module 124 may determine whether the second refinement flag is equal to a second predefined value. The method 500 may proceed to block 506 when the decoder module 124 determines that the second refinement flag is equal to the second predefined value. The method may proceed to block 507 when the decoder module 124 determines that the second refinement flag is different from the second predefined value.

In some implementations, with reference to FIG. 2, the decoder module 124 determines that the encoded data further includes the secondary flags each indicating whether all of the refinement tools are disabled during reconstruction of the corresponding region when the second refinement flag is equal to the second predefined value. In addition, the decoder module 124 determines that the encoded data does not include the secondary flags when the second refinement flag is different from the second predefined value. In other words, the secondary flags are not parsed from the encoded data when the second refinement flag is different from the second predefined value.

In some implementations, the second predefined value may be equal to one. Thus, the decoder module 124 determines that the encoded data further includes the secondary flags each corresponding to one of the one or more regions in the at least one image frame when the second refinement flag is equal to one. In addition, the decoder module 124 determines that the secondary flags are not included in the encoded data when the second refinement flag is equal to zero.

At block 506, the decoder module 124 may determine that a third refinement flag is present in a second syntax structure associated with a specific one of the one or more regions in a specific one of the at least one image frame.

In some implementations, each of the secondary flags is the third refinement flag included in a corresponding one of multiple second syntax structures. In some implementations, the encoded data may include the first syntax structure and the second syntax structures. In addition, the number of first syntax structure in the encoded data may be equal to one, and the number of second syntax structures in the encoded data may be equal to the number of regions included in the at least one image frame.

In some implementations, with reference to FIGS. 4A and 4B, the number of first syntax structure corresponding to the image group 4100 is equal to one, and the number of second syntax structures each corresponding to one of the regions 4111-4112, 4121, and 4131-4133 in the image group 4100 is equal to six. In the implementation, each of the second syntax structures 4311-4312, 4321, and 4331-4333 corresponds to one of the regions 4111-4112, 4121, and 4131-4133 in the image group 4100. Thus, the number of regions 4111-4112, 4121, and 4131-4133 in the image group 4100 may be equal to the number of second syntax structures 4311-4312, 4321, and 4331-4333.

In some implementations, a first syntax level of the first syntax structure 4300 is higher than a second syntax level of the second syntax structures 4311-4312, 4321, and 4331-4333. In the implementation, each of the second syntax structures 4311-4312, 4321, and 4331-4333 may have a reference to the first syntax structure 4300, and the first syntax structure 4300 has no reference to the second syntax structures 4311-4312, 4321, and 4331-4333. For example, each of the second syntax structures 4311-4312, 4321, and 4331-4333 may be a picture header. In another example, each of the second syntax structures 4311-4312, 4321, and 4331-4333 may be a slice header.

In some implementations, with reference to FIG. 2, the decoder module 124 determines that each of the second syntax structures includes one of the third refinement flags when the second refinement flag is equal to the second predefined value. Then, the decoder module 124 may determine the third refinement flags from the second syntax structures when the second refinement flag is equal to the second predefined value. In the implementation, each of the third refinement flags may indicate whether all the refinement tools are disabled when a corresponding one of the regions is reconstructed. In one implementation, the second predefined value is equal to one. Thus, the decoder module 124 may determine one of the third refinement flags from a corresponding one of second syntax structures corresponding to a specific one of the one or more regions in a specific one of the at least one image frame when the second refinement flag is equal to one. For example, the decoder module 124 may determine one of the refinement flags from the second syntax structures 4331 corresponding to the region 4131 of the third image frame 4130.

In some implementations, each of the third refinement flags included in a corresponding one of the second syntax structures also corresponds to one of the regions in the at least one image frame, since each of the second syntax structures corresponds to one of the regions in the at least one image frame.

In some implementations, each of the third refinement flags corresponds to all the refinement tools since each of the third refinement flags indicates whether all the refinement tools are disabled in a corresponding one of the regions in the at least one image frame.

In some implementations, each of the third refinement flags may be a refinement disabled flag indicating whether all the refinement tools are disabled when a corresponding one of the regions included in a corresponding one of the at least one image frame is reconstructed. In one implementation, the refinement t disabled flag may be a syntax element ph_refinement_disabled_flag, when the second syntax structure is the picture header. In addition, the refinement present flag may be a syntax element sps_refinement_control_present_in_ph_flag, when the first syntax structure is the SPS and the second syntax structure is the picture header. In the implementation, the second refinement flag may be the refinement present flag indicating whether the refinement disabled flags are included in the second syntax structures.

At block 507, the decoder module 124 may infer that the third refinement flag is equal to zero.

In some implementations, with reference to FIG. 2, the decoder module 124 determines that the third refinement flags are not present in the second syntax structures when the second refinement flag is different from the second pre-defined value. Then, the decoder module 124 infers that the third refinement flags for the regions in the at least one image frame are equal to zero when the third refinement flags are not present in the second syntax structures and the second refinement flag is present in the first syntax structure.

In some implementations, the second predefined value may be equal to one. Thus, the decoder module 124 deter-mines that the third refinement flags are not parsed from the second syntax structures when the second refinement flag is equal to zero. In addition, the third refinement flags are inferred to be equal to zero when the second refinement flag is equal to zero and the second refinement flag is present in the first syntax structure.

At block 508, the decoder module 124 may determine whether the third refinement flag is equal to a third pre-defined value. The method 500 may proceed to block 509 when the decoder module 124 determines that the third refinement flag is equal to the third predefined value. The method may proceed to block 510 when the decoder module 124 determines that the third refinement flag is different from the third predefined value.

In some implementations, with reference to FIG. 2, the decoder module 124 determines that at least one of the refinement tools is enabled in a specific one of the regions when the third refinement flag corresponding to the specific region is equal to the third predefined value. In addition, the decoder module 124 determines that all the refinement tools are disabled in the specific region when the third refinement flag corresponding to the specific region is different from the third predefined value. In other words, the specific region may not be reconstructed based on the refinement tools when the third refinement flag is different from the third predefined value.

In some implementations, the third predefined value may be equal to zero. Thus, the decoder module 124 determines that at least one of the refinement tools is enabled for the specific region when the third refinement flag is equal to zero. In addition, the decoder module 124 determines that all the refinement tools are disabled in the specific region when the third refinement flag is equal to one.

At block 509, the decoder module 124 may reconstruct the specific region based on multiple first candidate modes selected based on the first refinement flags.

In some implementations, with reference to FIG. 2, the decoder module 124 may determine that at least one of the refinement tools is enabled in the specific region when the third refinement flag corresponding to the specific region is equal to the third predefined value. Thus, the specific region may be reconstructed based on the first candidate mode including the at least one of the refinement tools when the third refinement flag is equal to the third predefined value. In some implementations, the at least one of the refinement tools may be selected from the refinement tools based on the first refinement flags. For example, a specific one of the refinement tools indicated by a specific one of the first refinement flags may be added into the first candidate modes when the specific first refinement flag is equal to the first predefined value. In addition, the specific refinement tool may be excluded from the first candidate modes when the specific first refinement flag is different from the first pre-defined value.

In some implementations, the third predefined value is equal to zero. In the implementation, the decoder module 124 may determine that the at least one of the refinement tools is enabled in the specific region when the refinement disabled flag is equal to zero. Then, the decoder module 124 may determine, from a third syntax structure, multiple block flags for a block unit included in the specific region. The block flags indicate whether a prediction block of the block unit is refined according to a specific one of the refinement tools.

For example, the first candidate mode may include the affine PROF mode when the first refinement flag for the affine PROF mode is equal to the first predefine value. Thus, the third syntax structure may include a specific one of the block flags corresponding to the affine PROF mode when the third refinement flag is equal to the third predefined value. In some implementations, the specific block flag corre-sponding to the affine PROF mode is an affine flag. When the affine flag of the block unit is equal to one, the decoder module 124 may determine that the block unit is predicted by the affine mode. Then, the decoder module 124 may predict the block unit based on the affine mode to generate the prediction block, and then refine the prediction block according to the affine PROF mode. In addition, the block flags corresponding to the BDOF mode are two list flags. When the two list flags of the block unit are equal to one, the decoder module 124 may determine that the block unit is predicted based on two reference frames. In the implemen-tation, the decoder module 124 may predict the block unit based on the two reference frames to generate the prediction block, and then refine the prediction block according to the BDOF mode. In at least implementation, the decoder mod-ule 124 may reconstruct the block unit based on the refined block by adding the refined block into a residual block of the block unit determined from the bitstream.

In some implementations, the third syntax structure is a block-based syntax corresponding to the block unit. Thus, the third syntax structure is different from the first syntax structure and the second syntax structure, and a third syntax level of the third syntax structure is lower than the first syntax level and the second syntax level.

In some implementations, the decoder module 124 may determine that the block unit is not reconstructed by a specific one of the refinement tools when the specific block flag corresponding to the specific refinement tool is equal to zero. Thus, the decoder module 124 may reconstruct the block unit based on another prediction mode different from the specific refinement tool to directly generate the predic-tion block without additional refining according to the specific refinement tool. In the implementation, the decoder module 124 may reconstruct the block unit based on the prediction block by adding the prediction block into the residual block of the block unit determined from the bit-stream.

At block 510, the decoder module 124 may reconstruct the specific region based on multiple second candidate modes excluding the refinement tools.

In some implementations, with reference to FIG. 2, the decoder module 124 may determine that all the refinement tools are disabled in the specific region when the third refinement flag corresponding to the specific region is dif-ferent from the third predefined value. Thus, the specific region may be reconstructed based on the second candidate modes excluding the refinement tools when the third refine-ment flag is different from the third predefined value. In one implementation, the third predefined value is equal to zero. In the implementation, the decoder module 124 may deter-mine that all the refinement tools are disabled in the specific region when the third refinement flag is equal to one. In addition, the specific region may be reconstructed based on the second candidate modes. In the implementation, the refinement tools are excluded from the first candidate modes to generate the second candidate modes.

In some implementations, the third refinement flag is the refinement disabled flag. In the implementation, the decoder module 124 may determine that all the refinement tools are disabled in the specific region when the refinement disabled flag is equal to one. Thus, the decoder module 124 may determine that multiple prediction blocks for multiple block units in the specific region are not refined according to the refinement tools when the specific region is reconstructed. In the implementation, the specific region is reconstructed based on the second candidate modes excluding the refinement tools. In the implementation, the refinement tools are excluded from the first candidate modes to generate the second candidate modes. For example, the decoder module 124 may predict one block unit in the specific region to generate one prediction block without additional refining of the prediction block according to the refinement tools, and then directly add the prediction block into a residual block of the block unit to reconstruct the block unit.

At block 511, the decoder module 124 may reconstruct the at least one image frame based on the second candidate modes.

In some implementations, with reference to FIG. 2, the decoder module 124 may determine that all the refinement tools are disabled in the at least one image frame when each of the first refinement flags is different from the first predefined value. Thus, the at least one image frame may be reconstructed based on the second candidate modes excluding the refinement tools when the first refinement flags are different from the first predefined value. In one implementation, the first predefined value is equal to one. In the implementation, the decoder module 124 may determine that the refinement tools are disabled in the at least one image frame when the first refinement flags are equal to zero. In addition, the at least one image frame may be reconstructed based on the second candidate modes when the first refinement flags are equal to zero.

In some implementations, the first refinement flags are the refinement enabled flags. In the implementation, the decoder module 124 may determine that the refinement tools are disabled in the at least one image frame when the refinement enabled flags are equal to zero. Thus, the decoder module 124 may determine that multiple prediction blocks for multiple block units in the at least one image frame is not refined according to the refinement tools when the at least one image frame is reconstructed. In the implementation, the at least one image frame is reconstructed based on the second candidate modes excluding the refinement tools. In the implementation, the refinement tools are excluded from the first candidate modes to generate the second candidate modes. For example, the decoder module 124 may predict one block unit in the at least one image frame to generate one prediction block, and then directly add the prediction block into a residual block of the block unit to reconstruct the block unit.

In some implementations, with reference to FIG. 2, the decoder module 124 determines that the second refinement flag is not present in the first syntax structure when the first refinement flags are different from the first predefined value. Then, the decoder module 124 infers that the second refinement flag for the at least one image frame is equal to zero when the second refinement flags are not present in the first syntax structures. In the implementation, the third refinement flags are not present in the second syntax structure, since the second refinement flag is inferred to be equal to zero. Thus, the third refinement flags are not parsed from the second syntax structures. In the implementation, the decoder module 124 may infer that the third refinement flags are equal to one for disabling all the refinement tools since the first refinement flags are different from the first predefined value for indicating that all the refinement tools are disabled in the at least one image frame.

In some implementations, the first refinement flags are the refinement enabled flag. In the implementation, the decoder module 124 may infer that the third refinement flags are equal to one for disabling all the refinement tools since the refinement enabled flags are equal to zero for indicating that all the refinement tools are disabled in the at least one image frame. The method/process 500 may then end.

Figure 6:
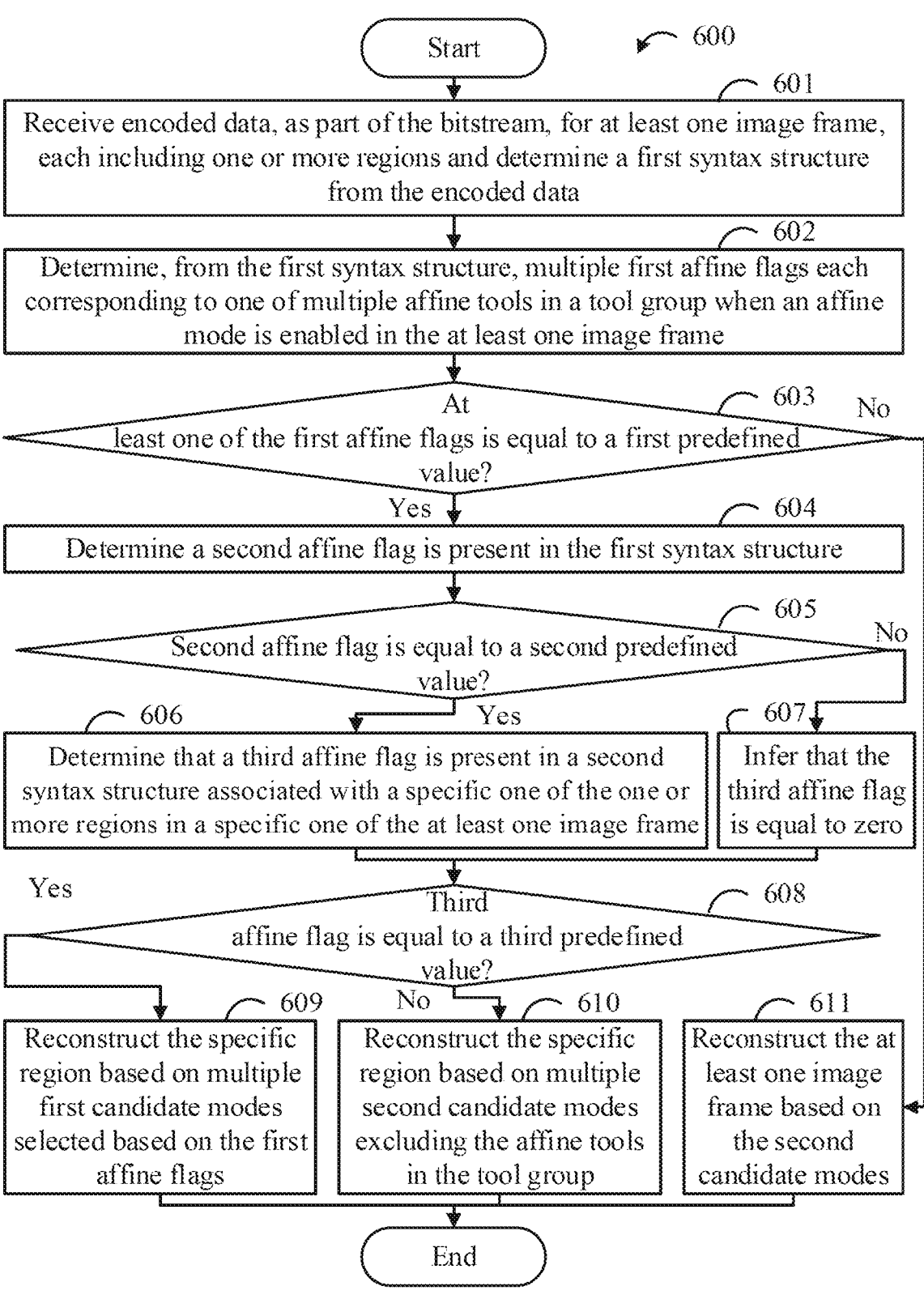
FIG. 6 is a flowchart illustrating another method/process for decoding and/or encoding video data by an electronic device, in accordance with one or more example implementations of this disclosure.

FIG. 6 is a flowchart illustrating another method/process 600 for decoding and/or encoding video data by an electronic device, in accordance with one or more example implementations of this disclosure. The method/process 600 is an example implementation, as there may be a variety of ways of decoding the video data.

The method/process 600 may be performed by an electronic device using the configurations illustrated in FIGS. 1 and/or 2, where various elements of these figures may be referenced to describe the method/process 600. Each block illustrated in FIG. 6 may represent one or more processes, methods, or subroutines performed by an electronic device.

The order in which the blocks appear in FIG. 6 is for illustration only, and may not be construed to limit the scope of the present disclosure, thus may be different from what is illustrated. Additional blocks may be added or fewer blocks may be utilized without departing from the scope of the present disclosure.

At block 601, the method/process 600 may start by the decoder module 124 receiving encoded data, as part of a bitstream, for at least one image frame, each including one or more regions and determines a first syntax structure from the encoded data.

With reference to FIGS. 1 and 2, the second electronic device 120 may receive the bitstream from an encoder, such as the first electronic device 110 (or other video providers), via the second interface 126. The second interface 126 may directly provide the bitstream to the decoder module 124 in some implementations. The bitstream may include the encoded data corresponding to the at least one image frame. Each of the at least one image frame may be divided into one or more regions.

In some implementations, the encoded data may include the first syntax structure corresponding to the at least one image frame. In some implementations, the first syntax structure may be one of a VPS, an SPS and a PPS.

At block 602, the decoder module 124 may determine, from the first syntax structure, multiple first affine flags each corresponding to one of multiple affine tools in a tool group when an affine mode is enabled in the at least one image frame.

In some implementations, with reference to FIG. 2, the decoder module 124 may determine an affine enabled flag from the first syntax structure. In the implementation, the affine mode may be enabled during reconstruction of the at least one image frame corresponding to the first syntax structure, when the affine enabled flag in the first syntax structure is equal to one. In some implementations, the affine mode may include multiple affine tools. Thus, the affine tools may be enabled during reconstruction of the at least one image frame, when the affine enabled flag is equal to one. In addition, the affine mode may be disabled for the at least one image frame, when the affine enabled flag in the first syntax structure is equal to zero. Thus, the at least one image frame is not reconstructed based on the affine tools when the affine enabled flag is equal to zero. In some implementations, the affine enabled flag may be a syntax element sps_affine_enabled_flag when the first syntax structure is the SPS.

In some implementations, each of the first affine flags may indicate whether a corresponding one of the affine tools is enabled for the at least one image frame when the affine mode is enabled in the at least one image frame according to the affine enabled flag. In the implementation, one of the first affine flags corresponds to one of the affine tools.

In some implementations, some of the affine tools may be included in the tool group, and the others of the affine tool are not included in the tool group. In the implementation, the decoder module 124 may determine the first affine flags for the affine tools included in the tool group.

In some implementations, each of the first affine flags may indicate whether a corresponding one of the affine tools in the tool group is enabled for the at least one image frame. In some implementations, the affine tools in the tool group may include one or more of an affine PROF mode, an AMVR mode, and other affine tools. In addition, each of the first affine flags may be an affine tool enabled flag indicating whether a corresponding one of the affine tools in the tool group is enabled when the at least one image frame is reconstructed. In one implementation, each of the affine tool enabled flags may be a syntax element sps_affine_enabled_flag, when the first syntax structure is the SPS. For example, the affine tool enabled flags may include more than one of a syntax element sps_affine_prof_enabled_flag, a syntax element sps_affine_amvr_enabled_flag.

At block 603, the decoder module 124 may determine whether at least one of the first affine flags is equal to a first predefined value. The method 600 may proceed to block 604 when the decoder module 124 determines that one or more of the first affine flags are equal to the first predefined value. The method may proceed to block 611 when the decoder module 124 determines that each of the first affine flags is different from the first predefined value.

In some implementations, with reference to FIG. 2, the decoder module 124 determines that at least one of the affine tools in the tool group is enabled for the at least one image frame when at least one of the first affine flags is equal to the first predefined value. In addition, the decoder module 124 determines that all the affine tools of the tool group are disabled during reconstruction of the at least one image frame when each of the first affine flags is different from the first predefined value. In other words, the at least one image frame is not reconstructed based on the affine tools in the tool group when the first affine flags are different from the first predefined value.

In some implementations, the first predefined value may be equal to one. Thus, the decoder module 124 determines that one of the affine tools in the tool group is enabled for the at least one image frame when one of the first affine flags is equal to one. In addition, the decoder module 124 determines that the affine tools in the tool group are disabled during reconstruction of the at least one image frame when all of the first affine flags are equal to zero.

At block 604, the decoder module 124 may determine that a second affine flag is present in the first syntax structure.

In some implementations, with reference to FIG. 2, the decoder module 124 may determine that the first syntax structure includes the second affine flag when at least one of the first affine flags is equal to the first predefined value. Then, the decoder module 124 may determine the second affine flag from the first syntax structure. In one implementation, the first predefined value is equal to one. Thus, the decoder module 124 may determine the second affine flag from the first syntax structure when at least one of the first affine flags is equal to one.

In some implementations, the second affine flag may indicate whether the encoded data further includes multiple secondary flags each indicating whether all of the affine tools in the tool group are disabled during reconstruction of a corresponding one of the regions in the at least one image frame when at least one of the affine tools in the tool group is enabled in the at least one image frame according to the first affine flags.

In some implementations, the second affine flag may be an affine present flag indicating whether the encoded data further includes the secondary flag indicating whether all the affine tools of the tool group are disabled during reconstruction of one of the regions included in the at least one image frame. In the implementation, the secondary flag corresponds to the one of the regions in the at least one image frame.

In some implementations, the second affine flag only associates with the affine tools of the tool group. In the implementation, the second affine flag is unrelated to the affine tools which are not included in the tool group.

At block 605, the decoder module 124 may determine whether the second affine flag is equal to a second predefined value. The method 600 may proceed to block 606 when the decoder module 124 determines that the second affine flag is equal to the second predefined value. The method may proceed to block 607 when the decoder module 124 determines that the second affine flag is different from the second predefined value.

In some implementations, with reference to FIG. 2, the decoder module 124 determines that the encoded data further includes the secondary flags each indicating whether all the affine tools in the tool group are disabled during reconstruction of the corresponding region when the second affine flag is equal to the second predefined value. In addition, the decoder module 124 determines that the encoded data does not include the secondary flags when the second affine flag is different from the second predefined value. In other words, the secondary flags are not parsed from the encoded data when the second affine flag is different from the second predefined value.

In some implementations, the second predefined value may be equal to one. Thus, the decoder module 124 determines that the encoded data further includes the secondary flags each corresponding to one of the one or more regions in the at least one image frame when the second affine flag is equal to one. In addition, the decoder module 124 determines that the secondary flags are not included in the encoded data when the second affine flag is equal to zero.

At block 606, the decoder module 124 may determine that a third affine flag is present in a second syntax structure associated with a specific one of the one or more regions in a specific one of the at least one image frame.

In some implementations, each of the secondary flags is the third affine flag included in a corresponding one of multiple second syntax structures. In some implementations, the encoded data may include the first syntax structure and the second syntax structures. In addition, the number of first syntax structure in the encoded data may be equal to one, and the number of second syntax structures in the encoded data may be equal to the number of regions included in the at least one image frame.

In some implementations, a first syntax level of the first syntax structure is higher than a second syntax level of the second syntax structures. In the implementation, each of the second syntax structures may have a reference to the first syntax structure, but the first syntax structure has no reference to the second syntax structures. For example, each of the second syntax structures may be a picture header. In another example, each of the second syntax structures may be a slice header.

In some implementations, with reference to FIG. 2, the decoder module 124 determines that each of the second syntax structures includes one of the third affine flags when the second affine flag is equal to the second predefined value. Then, the decoder module 124 may determine the third affine flags from the second syntax structures when the second affine flag is equal to the second predefined value. In the implementation, each of the third affine flags may indicate whether all the affine tools in the tool group are disabled when a corresponding one of the regions is reconstructed. In one implementation, the second predefined value is equal to one. Thus, the decoder module 124 may determine one of the third affine flags from a corresponding one of second syntax structures corresponding to a specific one of the one or more regions in a specific one of the at least one image frame when the second affine flag is equal to one.

In some implementations, each of the third affine flags included in a corresponding one of the second syntax structures also corresponds to one of the regions in the at least one image frame, since each of the second syntax structures corresponds to one of the regions in the at least one image frame.

In some implementations, each of the third affine flags corresponds to all the affine tools in the tool group, since each of the third affine flags indicates whether all the affine tools in the tool group are disabled in a corresponding one of the regions in the at least one image frame. In the implementation, each of the third affine flags is unrelated to the affine tools which are not included in the tool group.

In some implementations, each of the third affine flags may be an affine disabled flag indicating whether all the affine tools in the tool group are disabled when a corresponding one of the regions included in a corresponding one of the at least one image frame is reconstructed.

At block 607, the decoder module 124 may infer that the third affine flag is equal to zero.

In some implementations, with reference to FIG. 2, the decoder module 124 determines that the third affine flags are not present in the second syntax structures when the second affine flag is different from the second predefined value. Then, the decoder module 124 infers that the third affine flags for the regions in the at least one image frame are equal to zero when the third affine flags are not present in the second syntax structures and the second affine flag is present in the first syntax structure.

In some implementations, the second predefined value may be equal to one. Thus, the decoder module 124 determines that the third affine flags are not parsed from the second syntax structures when the second affine flag is equal to zero. In addition, the third affine flags are inferred to be equal to zero when the second affine flag is equal to zero and the second affine flag is present in the first syntax structure.

At block 608, the decoder module 124 may determine whether the third affine flag is equal to a third predefined value. The method 600 may proceed to block 609 when the decoder module 124 determines that the third affine flag is equal to the third predefined value. The method may proceed to block 610 when the decoder module 124 determines that the third affine flag is different from the third predefined value.

In some implementations, with reference to FIG. 2, the decoder module 124 determines that at least one of the affine tools in the tool group is enabled in a specific one of the regions when the third affine flag corresponding to the specific region is equal to the third predefined value. In addition, the decoder module 124 determines that all the affine tools in the tool group are disabled in the specific region when the third affine flag corresponding to the specific region is different from the third predefined value. In other words, the specific region may not be reconstructed based on the affine tools of the tool group when the third affine flag is different from the third predefined value.

In some implementations, the third predefined value may be equal to zero. Thus, the decoder module 124 determines that at least one of the affine tools in the tool group is enabled for the specific region when the third affine flag is equal to zero. In addition, the decoder module 124 determines that all the affine tools of the tool group are disabled in the specific region when the third affine flag is equal to one.

At block 609, the decoder module 124 may reconstruct the specific region based on multiple first candidate modes selected based on the first affine flags.

In some implementations, with reference to FIG. 2, the decoder module 124 may determine that at least one of the affine tools in the tool group is enabled in the specific region when the third affine flag corresponding to the specific region is equal to the third predefined value. Thus, the specific region may be reconstructed based on the first candidate mode including the at least one of the affine tools in the tool group when the third affine flag is equal to the third predefined value. In some implementations, the at least one of the affine tools in the tool group may be selected from the affine tools based on the first affine flags. For example, a specific one of the affine tools indicated by a specific one of the first affine flags may be added into the first candidate modes when the specific first affine flag is equal to the first predefined value. In addition, the specific affine tool may be excluded from the first candidate modes when the specific first affine flag is different from the first predefined value.

In some implementations, the affine tools which are not included in the tool group are unrelated to the second affine flag and the third affine flags. Thus, the first candidate modes may include the affine tools, which are not included in the tool group, and other prediction modes.

In some implementations, the third predefined value is equal to zero. In the implementation, the decoder module 124 may determine that the at least one of the affine tools in the tool group is enabled in the specific region when the affine disabled flag is equal to zero. Then, the decoder module 124 may determine, from a third syntax structure, multiple block flags for a block unit included in the specific region. In the implementation, a specific one of the block flags indicates whether a prediction block of the block unit is reconstructed by a specific one of the affine tools.

In some implementations, the third syntax structure is a block-based syntax corresponding to the block unit. Thus, the third syntax structure is different from the first syntax structure and the second syntax structure, and a third syntax level of the third syntax structure is lower than the first syntax level and the second syntax level.

At block 610, the decoder module 124 may reconstruct the specific region based on multiple second candidate modes excluding the affine tools in the tool group.

In some implementations, with reference to FIG. 2, the decoder module 124 may determine that all the affine tools in the tool group are disabled in the specific region when the third affine flag corresponding to the specific region is different from the third predefined value. Thus, the specific region may be reconstructed based on the second candidate modes excluding the affine tools in the tool group when the third affine flag is different from the third predefined value. In one implementation, the third predefined value is equal to zero. In the implementation, the decoder module 124 may determine that all the affine tools in the tool group are disabled in the specific region when the third affine flag is equal to one. In addition, the specific region may be reconstructed based on the second candidate modes. In the implementation, the affine tools in the tool group are excluded from the first candidate modes to generate the second candidate modes.

In some implementations, the affine tools which are not included in the tool group are unrelated to the second affine flag and the third affine flags. Thus, the affine tools which are not included in the tool group may still be included in the second candidate modes when the third affine flag is different from the third predefined value.

In some implementations, the third affine flag is the affine disabled flag. In the implementation, the decoder module 124 may determine that all the affine tools in the tool group are disabled in the specific region when the affine disabled flag is equal to one. Thus, the decoder module 124 may determine that multiple prediction blocks for multiple block units in the specific region are not reconstructed by the affine tools in the tool group when the specific region is reconstructed. In the implementation, the specific region is reconstructed based on the second candidate modes excluding the affine tools in the tool group. In the implementation, the affine tools in the tool group are excluded from the first candidate modes to generate the second candidate modes.

At block 611, the decoder module 124 may reconstruct the at least one image frame based on the second candidate modes.

In some implementations, with reference to FIG. 2, the decoder module 124 may determine that all the affine tools in the tool group are disabled in the at least one image frame when each of the first affine flags is different from the first predefined value. Thus, the at least one image frame may be reconstructed based on the second candidate modes excluding the affine tools in the tool group when the first affine flags are different from the first predefined value. In one implementation, the first predefined value is equal to one. In the implementation, the decoder module 124 may determine that the affine tools in the tool group are disabled in the at least one image frame when the first affine flags are equal to zero. In addition, the at least one image frame may be reconstructed based on the second candidate modes when the first affine flags are equal to zero.

In some implementations, with reference to FIG. 2, the decoder module 124 determines that the second affine flag is not present in the first syntax structure when all the first affine flags are different from the first predefined value. Then, the decoder module 124 infers that the second affine flag for the at least one image frame is equal to zero when the second affine flags are not present in the first syntax structures. In the implementation, the third affine flags are not present in the second syntax structure, since the second affine flag is inferred to be equal to zero. Thus, the third affine flags are not parsed from the second syntax structures. In the implementation, the decoder module 124 may infer that the third affine flags are equal to one for disabling all the affine tools in the tool group since the first affine flags are different from the first predefined value for indicating that all the affine tools in the tool group are disabled in the at least one image frame.

Figure 7:
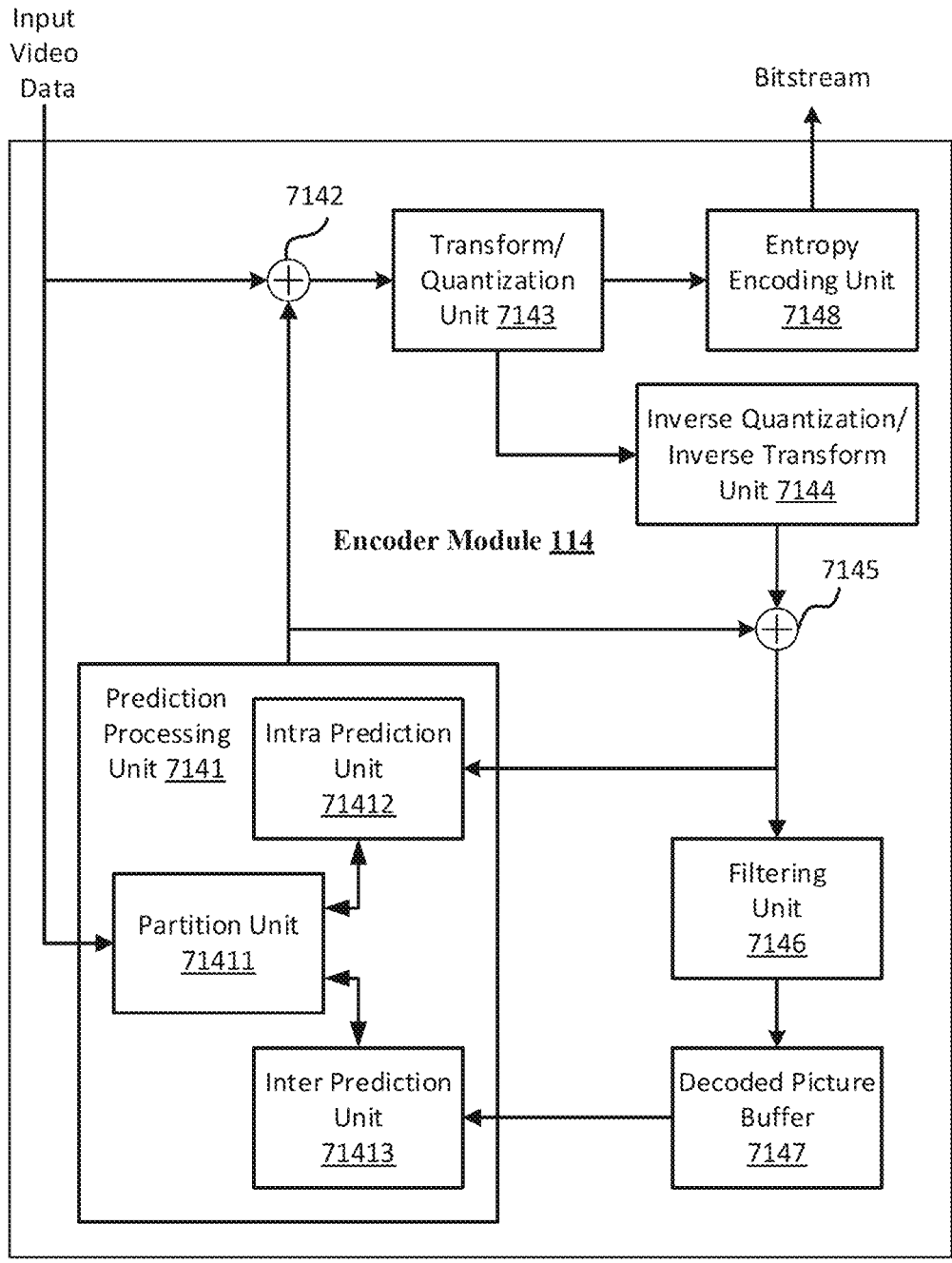
FIG. 7 is a block diagram illustrating an encoder module of the first electronic device illustrated in FIG. 1, in accordance with one or more example implementations of this disclosure.

FIG. 7 is a block diagram illustrating an encoder module 114 of the first electronic device 110 illustrated in FIG. 1, in accordance with one or more example implementations of this disclosure. The encoder module 114 may include a prediction processor (e.g., a prediction processing unit 9141), at least a first summer (e.g., a first summer 9142) and a second summer (e.g., a second summer 9145), a transform/quantization processor (e.g., a transform/quantization unit 9143), an inverse quantization/inverse transform processor (e.g., an inverse quantization/inverse transform unit 9144), a filter (e.g., a filtering unit 9146), a decoded picture buffer (e.g., a decoded picture buffer 9147), and an entropy encoder (e.g., an entropy encoding unit 9148). The prediction processing unit 9141 of the encoder module 114 may further include a partition processor (e.g., a partition unit 91411), an intra prediction processor (e.g., an intra prediction unit 91412), and an inter prediction processor (e.g., an inter prediction unit 91413). The encoder module 114 may receive the source video and encode the source video to output a bitstream.

The encoder module 114 may receive source video including multiple image frames and then divide the image frames according to a coding structure. Each of the image frames may be divided into at least one image block.

The at least one image block may include a luminance block having multiple luminance samples and at least one chrominance block having multiple chrominance samples. The luminance block and the at least one chrominance block may be further divided to generate macroblocks, CTUs, CBs, sub-divisions thereof, and/or other equivalent coding units.

The encoder module 114 may perform additional sub-divisions of the source video. It should be noted that the disclosed implementations are generally applicable to video coding regardless of how the source video is partitioned prior to and/or during the encoding.

During the encoding process, the prediction processing unit 9141 may receive a current image block of a specific one of the image frames. The current image block may be the luminance block or one of the chrominance blocks in the specific image frame.

The partition unit 91411 may divide the current image block into multiple block units. The intra prediction unit 91412 may perform intra-predictive coding of a current block unit relative to one or more neighboring blocks in the same frame as the current block unit in order to provide spatial prediction. The inter prediction unit 91413 may perform inter-predictive coding of the current block unit relative to one or more blocks in one or more reference image blocks to provide temporal prediction.

The prediction processing unit 9141 may select one of the coding results generated by the intra prediction unit 91412 and the inter prediction unit 91413 based on a mode selection method, such as a cost function. The mode selection method may be a rate-distortion optimization (RDO) process.

The prediction processing unit 9141 may determine the selected coding result and provide a predicted block corresponding to the selected coding result to the first summer 9142 for generating a residual block and to the second summer 9145 for reconstructing the encoded block unit. The prediction processing unit 9141 may further provide syntax elements, such as motion vectors, intra-mode indicators, partition information, and/or other syntax information, to the entropy encoding unit 9148.

The intra prediction unit 91412 may intra-predict the current block unit. The intra prediction unit 91412 may determine an intra prediction mode directed toward a reconstructed sample neighboring the current block unit in order to encode the current block unit.

The intra prediction unit 91412 may encode the current block unit using various intra prediction modes. The intra prediction unit 91412 of the prediction processing unit 9141 may select an appropriate intra prediction mode from the selected modes. The intra prediction unit 91412 may encode the current block unit using a cross-component prediction mode to predict one of the two chroma components of the current block unit based on the luma components of the current block unit. The intra prediction unit 91412 may predict a first one of the two chroma components of the current block unit based on the second of the two chroma components of the current block unit.

The inter prediction unit 91413 may inter-predict the current block unit as an alternative to the intra prediction performed by the intra prediction unit 91412. The inter prediction unit 91413 may perform motion estimation to estimate motion of the current block unit for generating a motion vector.

The motion vector may indicate a displacement of the current block unit within the current image block relative to a reference block unit within a reference image block. The inter prediction unit 91413 may receive at least one reference image block stored in the decoded picture buffer 9147 and estimate the motion based on the received reference image blocks to generate the motion vector.

The first summer 9142 may generate the residual block by subtracting the prediction block determined by the prediction processing unit 9141 from the original current block unit. The first summer 9142 may represent the component or components that perform this subtraction.

The transform/quantization unit 9143 may apply a transform to the residual block in order to generate a residual transform coefficient and then quantize the residual transform coefficients to further reduce the bit rate. The transform may be one of a DCT, DST, AMT, MDNSST, HyGT, signal-dependent transform, KLT, wavelet transform, integer transform, sub-band transform, and a conceptually similar transform.

The transform may convert the residual information from a pixel value domain to a transform domain, such as a frequency domain. The degree of quantization may be modified by adjusting a quantization parameter.

The transform/quantization unit 9143 may perform a scan of the matrix including the quantized transform coefficients. Alternatively, the entropy encoding unit 9148 may perform the scan.

The entropy encoding unit 9148 may receive multiple syntax elements from the prediction processing unit 9141 and the transform/quantization unit 9143, including a quantization parameter, transform data, motion vectors, intra modes, partition information, and/or other syntax information. The entropy encoding unit 9148 may encode the syntax elements in the bitstream.

The entropy encoding unit 9148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120, as shown in FIG. 1) or archived for later transmission or retrieval.

The inverse quantization/inverse transform unit 9144 may apply inverse quantization and inverse transformation to reconstruct the residual block in the pixel domain for later use as a reference block. The second summer 9145 may add the reconstructed residual block to the prediction block provided by the prediction processing unit 9141 in order to produce a reconstructed block for storage in the decoded picture buffer 9147.

The filtering unit 9146 may include a deblocking filter, an SAO filter, a bilateral filter, and/or an ALF to remove blocking artifacts from the reconstructed block. Other filters (in loop or post loop) may be used in addition to the deblocking filter, the SAO filter, the bilateral filter, and the ALF. Such filters are not illustrated for brevity and may filter the output of the second summer 9145.

The decoded picture buffer 9147 may be a reference picture memory that stores the reference block to be used by the encoder module 914 to encode video, such as in intra-coding or inter-coding modes. The decoded picture buffer 9147 may include a variety of memory devices, such as DRAM (e.g., including SDRAM), MRAM, RRAM, or other types of memory devices. The decoded picture buffer 9147 may be on-chip with other components of the encoder module 114 or off-chip relative to those components.

In some implementations, the encoder module 114 may receive video data and use multiple prediction modes to predict multiple image frames in the video data. In the implementation, the prediction modes may include multiple refinement tools and an affine mode having multiple affine tools. In some implementations, with respect to FIG. 2, the encoder module 114 may signal at least one of a first affine flag, a second affine flag, and multiple third affine flags according to the prediction result to generate encoded data corresponding to at least one image frame of the video data, and then add the encoded data in the bitstream for providing to the decoder module 124. In some other implementations, the encoder module 114 may signal at least one of multiple first refinement flags, a second refinement flag, and multiple third refinement flags according to the prediction result to generate encoded data corresponding to at least one image frame of the video data, and then add the encoded data in the bitstream for providing to the decoder module 124.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of encoding video data performed by an electronic device, the method comprising:

receiving the video data, including at least one image frame, each of the at least one image frame including one or more regions;

signaling a first affine flag in a sequence parameter set (SPS), associated with the at least one image frame, when an affine mode is enabled in the at least one image frame, wherein the SPS is included in encoded data and the affine mode includes a plurality of affine tools;

determining that a second affine flag is signaled in the SPS when the first affine flag is equal to one;

determining that a third affine flag is signaled in a slice header, associated with a specific one of the one or more regions in a specific one of the at least one image frame, when the second affine flag is equal to one, wherein:

the slice header is included in the encoded data, the third affine flag corresponds to one of the plurality of affine tools, the one of the plurality of affine tools comprises an affine prediction refinement with optical flow (PROF) mode, and the third affine flag comprises an affine PROF disabled flag, indicating whether the affine PROF mode is disabled, when the specific one of the one or more regions associated with the slice header is reconstructed; and reconstructing the specific one of the one or more regions based on a plurality of first candidate modes, including the one of the plurality of affine tools, when the third affine flag is equal to zero.

2. The method according to claim 1, further comprising:
determining that the third affine flag is not signaled in the slice header when the second affine flag is equal to zero.

3. The method according to claim 2, further comprising:
determining that the second affine flag is not signaled in the SPS when the first affine flag is equal to zero; and
inferring that the second affine flag is equal to zero when the second affine flag is not signaled in the SPS.

4. The method according to claim 1, further comprising:
inferring that the third affine flag is equal to zero when the second affine flag is signaled in the SPS and the third affine flag is not signaled in the slice header.

5. The method according to claim 1, further comprising:
disabling the affine PROF mode for the specific one of the one or more regions when the third affine flag is equal to one; and
reconstructing the specific one of the one or more regions based on a plurality of second candidate modes when the third affine flag is equal to one, wherein the affine PROF mode is excluded from the plurality of first candidate modes to generate the plurality of second candidate modes.

6. The method according to claim 1, wherein:
a syntax level of the SPS is higher than a syntax level of the slice header,
the at least one image frame is included in a video sequence of the video data and the SPS corresponds to the video sequence, and
the specific one of the one or more regions comprises a slice, that is included in the specific one of the at least one image frame in the video sequence, and the slice header corresponds to the slice.

7. The method according to claim 1, wherein:
the first affine flag comprises an affine PROF enabled flag, indicating whether the affine PROF mode is enabled, when the at least one image frame, associated with the SPS, is reconstructed, and
the second affine flag comprises an affine PROF present flag, indicating whether the affine PROF disabled flag is included in the slice header, when the second affine flag is equal to one.

8. The method according to claim 7, further comprising:
disabling the affine PROF mode for the at least one image frame, associated with the SPS, when the affine PROF enabled flag is equal to zero; and
reconstructing the at least one image frame based on a plurality of second candidate modes when the affine PROF enabled flag is equal to zero, wherein the affine PROF mode is excluded from the plurality of first candidate modes to generate the plurality of second candidate modes.

9. The method according to claim 7, further comprising:
enabling the affine PROF mode for the specific one of the one or more regions, associated with the slice header, when the affine PROF disabled flag is equal to zero;

signaling a block flag, in a syntax structure corresponding to a block unit, indicating whether the block unit in the specific one of the one or more regions is predicted by the affine mode, when the affine PROF disabled flag is equal to zero, wherein the syntax structure is different from the SPS and the slice header;

predicting the block unit based on the affine mode to generate a prediction block when the block flag is equal to one; and refining the prediction block according to the affine PROF mode when the block flag is equal to one.

10. An electronic device for encoding video data, the electronic device comprising:
at least one processor; and
at least one non-transitory computer-readable medium coupled to the at least one processor and storing one or more computer-executable instructions that, when executed by the at least one processor, cause the electronic device to:
receive the video data, including at least one image frame, each of the at least one image frame including one or more regions;
signal a first affine flag in a sequence parameter set (SPS) (SPS), associated with the at least one image frame, when an affine mode is enabled in the at least one image frame, wherein the SPS is included in encoded data and the affine mode includes a plurality of affine tools;
determine that a second affine flag is signaled in the SPS when the first affine flag is equal to one;
determine that a third affine flag is signaled in a slice header, associated with a specific one of the one or more regions in a specific one of the at least one image frame, when the second affine flag is equal to one, wherein:
the slice header is included in the encoded data,
the third affine flag corresponds to one of the plurality of affine tools,
the one of the plurality of affine tools comprises an affine prediction refinement with optical flow (PROF) mode, and
the third affine flag comprises an affine PROF disabled flag, indicating whether the affine PROF mode is disabled, when the specific one of the one or more regions associated with the slice header is reconstructed; and
reconstruct the specific one of the one or more regions based on a plurality of first candidate modes, including the one of the plurality of affine tools, when the third affine flag is equal to zero.

11. The electronic device according to claim 10, wherein the one or more computer-executable instructions, when executed by the at least one processor, further cause the electronic device to:
determine that the second affine flag is not signaled in the SPS when the first affine flag is equal to zero;
infer that the second affine flag is equal to zero when the second affine flag is not signaled in the SPS; and
determine that the third affine flag is not signaled in the slice header when the second affine flag is equal to zero.

12. The electronic device according to claim 10, wherein the one or more computer-executable instructions, when executed by the at least one processor, further cause the electronic device to:
determine that the third affine flag is not signaled in the slice header when the second affine flag is equal to zero; and infer that the third affine flag is equal to zero when the second affine flag is signaled in the SPS and the third affine flag is not signaled in the slice header.

13. The electronic device according to claim 10, wherein the one or more computer-executable instructions, when executed by the at least one processor, further cause the electronic device to:

disable the affine PROF mode for the specific one of the one or more regions when the third affine flag is equal to one; and reconstruct the specific one of the one or more regions based on a plurality of second candidate modes when the third affine flag is equal to one, wherein the affine PROF mode is excluded from the plurality of first candidate modes to generate the plurality of second candidate modes.

14. The electronic device according to claim 10, wherein:

the first affine flag comprises an affine PROF enabled flag, indicating whether the affine PROF mode is enabled, when the at least one image frame, associated with the SPS, is reconstructed, and the second affine flag comprises an affine PROF present flag, indicating whether the affine PROF disabled flag is included in the slice header, when the second affine flag is equal to one.

15. The electronic device according to claim 14, wherein the one or more computer-executable instructions, when executed by the at least one processor, further cause the electronic device to:

disable the affine PROF mode for the at least one image frame, associated with the SPS, when the affine PROF enable flag is equal to zero; and reconstruct the at least one image frame based on a plurality of second candidate modes when the affine PROF enabled flag is equal to zero, wherein the affine PROF mode is excluded from the plurality of first candidate modes to generate the plurality of second candidate modes.

16. A method of encoding video data performed by an electronic device, the method comprising:

receiving the video data, including at least one image frame, each of the at least one image frame including one or more regions;

signaling a first affine flag in a sequence parameter set (SPS), associated with the at least one image frame, when an affine mode is enabled in the at least one image frame, wherein the SPS is included in encoded data and the affine mode includes a plurality of affine tools;

determining, based on the first affine flag, whether a second affine flag is signaled in the SPS;

determining, based on the second affine flag, whether a third affine flag is signaled in a slice header, associated with a specific one of the one or more regions in a specific one of the at least one image frame, wherein:

the slice header is included in the encoded data, the third affine flag corresponds to one of the plurality of affine tools, the one of the plurality of affine tools comprises an affine prediction refinement with optical flow (PROF) mode, and the third affine flag comprises an affine PROF disabled flag, indicating whether the affine PROF mode is disabled, when the specific one of the one or more regions associated with the slice header is reconstructed; and reconstructing the specific one of the one or more regions based on a plurality of first candidate modes, including the one of the plurality of affine tools, when the third affine flag is equal to zero.

17. The method according to claim 16, further comprising:

determining that the second affine flag is signaled in the SPS when the first affine flag is equal to one; and determining that the second affine flag is not signaled in the SPS and inferring that the second affine flag is equal to zero when the first affine flag is equal to zero.

18. The method according to claim 16, further comprising:

determining that the third affine flag is signaled in the slice header when the second affine flag is equal to one; and determining that the third affine flag is not signaled in the slice header when the second affine flag is equal to zero.

19. The method according to claim 16, further comprising:

disabling the affine PROF mode for the at least one image frame, associated with the SPS, when the first affine flag is equal to zero; and reconstructing the at least one image frame based on a plurality of second candidate modes when the affine PROF enabled flag is equal to zero, wherein the affine PROF mode is excluded from the plurality of first candidate modes to generate the plurality of second candidate modes, wherein the first affine flag comprises an affine PROF enabled flag, indicating whether the affine PROF mode is enabled, when the at least one image frame associated with the SPS is reconstructed.

* * * * *